United States Patent
Watanabe et al.

(10) Patent No.: US 12,535,138 B2
(45) Date of Patent: *Jan. 27, 2026

(54) SEAL RING

(71) Applicant: NOK CORPORATION, Tokyo (JP)

(72) Inventors: Hideya Watanabe, Kitaibaraki (JP); Yusuke Yoshida, Kitaibaraki (JP)

(73) Assignee: NOK CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,944

(22) Filed: Apr. 12, 2024

(65) Prior Publication Data

US 2024/0263703 A1 Aug. 8, 2024

Related U.S. Application Data

(63) Continuation of application No. 17/623,715, filed as application No. PCT/JP2020/019122 on May 13, 2020, now Pat. No. 12,104,698.

(30) Foreign Application Priority Data

Jul. 12, 2019 (JP) .................................. 2019-130173
Jan. 23, 2020 (JP) .................................. 2020-008914

(51) Int. Cl.
*F16J 15/18* (2006.01)
*F16J 15/3272* (2016.01)
(Continued)

(52) U.S. Cl.
CPC ........... *F16J 15/18* (2013.01); *F16J 15/3272* (2013.01); *F16J 15/104* (2013.01); *F16J 15/164* (2013.01)

(58) Field of Classification Search
CPC ........ F16J 15/18; F16J 15/3272; F16J 15/104; F16J 15/164; F16J 15/441
See application file for complete search history.

(56) References Cited

U.S. PATENT DOCUMENTS 4,165,079 A * 8/1979 Clements .................. F16J 9/28
277/580
11,333,250 B2 * 5/2022 Yoshida ............... F16J 15/3284
(Continued)

FOREIGN PATENT DOCUMENTS

EP 2233813 A1 * 9/2010 ............. F16J 15/002
JP S61-165071 A 7/1986
(Continued)

OTHER PUBLICATIONS

International Search Report (English and Japanese) issued in PCT/JP2020/019122, mailed Jun. 16, 2020; ISA/JP (5 pages).
(Continued)

*Primary Examiner* — Christine M Mills
*Assistant Examiner* — L. Susmitha Koneru
(74) *Attorney, Agent, or Firm* — Harness, Dickey & Pierce, P.L.C.

(57) ABSTRACT

A circular annular seal ring made from a resin is adapted to be disposed between an outer member and an inner member that rotate relative to each other. The seal ring is disposed in a circumferential groove of the outer member or the inner member to isolate a liquid space from an external space. The seal ring is formed from an elongated and arcuate rod to define a circle by joining ends of the rod, and has a junction formed from the ends. The seal ring has a radial thickness gradually decreasing from two points that are apart from the junction toward the junction. The points are separated from the junction by an angle of not less than 60 degrees and not more than 150 degrees about a central axis of the circle.

19 Claims, 13 Drawing Sheets

(51) Int. Cl.
*F16J 15/10* (2006.01)
*F16J 15/16* (2006.01)

(56) References Cited

U.S. PATENT DOCUMENTS

| | | | | |
|---|---|---|---|---|
| 2013/0174419 | A1* | 7/2013 | Meyer | F16J 9/14 |
| | | | | 29/888.074 |
| 2015/0362074 | A1* | 12/2015 | Seki | F16J 15/441 |
| | | | | 277/512 |
| 2021/0140545 | A1* | 5/2021 | Yoshida | F16J 15/26 |
| 2021/0356044 | A1* | 11/2021 | Yoshida | F16J 15/3204 |

FOREIGN PATENT DOCUMENTS

| JP | 2013-540242 A | 10/2013 |
|---|---|---|
| JP | 2015-218791 A | 12/2015 |
| JP | 2015218790 A * | 12/2015 |
| JP | 2016-014471 A | 1/2016 |
| WO | 2012-041267 A1 | 4/2012 |
| WO | 2015-190353 A1 | 12/2015 |

OTHER PUBLICATIONS

Extended European Search Report for corresponding Application No. 20839557.4 dated Jul. 28, 2022 (8 Pages).
Office Action issued in corresponding Korean Patent Application No. 10-2022-7000021 dated Jun. 19, 2023, with English translation (15 Pages).
Notice of First Examination Opinion issued in corresponding Chinese Patent Application No. 202080049213.7 dated Oct. 12, 2023, with English translation (19 Pages).
Patent Rejection Decision issued in corresponding Korean Patent Application No. 10-2022-7000021 dated Dec. 20, 2023, with English translation (5 Pages).

* cited by examiner

SEAL RING

CROSS REFERENCE TO RELATED APPLICATIONS

This application is a continuation of U.S. patent application Ser. No. 17/623,715 filed Dec. 29, 2021, which is a National Phase Application under 35 U.S.C. 371 of International Application No. PCT/JP2020/019122, filed on May 13, 2020, which claims priority to Japanese Patent Application No. 2019-130173 filed on Jul. 12, 2019, and Japanese Patent Application No. 2020-008914 filed on Jan. 23, 2020. The entire disclosures of the above applications are expressly incorporated by reference herein.

BACKGROUND

Technical Field

The present invention relates to a circular annular seal ring made from a resin that are disposed between an outer member and an inner member that rotate relative to each other.

Related Art

Circular annular seal rings are used to seal annular gaps in a variety of machines having rotating members. For example, a seal ring is disposed between a power transmission shaft and a housing in an automotive vehicle to seal lubricating oil in the housing.

Generally, a seal ring is formed from an elongated arcuate rod to form a circle by joining the ends of the rod.

Various proposals have been made regarding shapes of seal rings (JP-A-2016-014471 and JP-A-2015-218790).

SUMMARY

From the viewpoint of enhancing the sealing ability of the seal ring, it is ideal that the outer or inner peripheral surface of the seal ring matches a true cylindrical shape and that there is no gap between the member to be sealed and the seal ring.

Accordingly, the present invention provides a seal ring in which, when the seal ring is deployed in place, the gap between the member to be sealed and the seal ring is extremely small.

According to an aspect of the present invention, there is provided a circular annular seal ring made from a resin and adapted to be disposed between an outer member and an inner member that rotate relative to each other. The seal ring is formed from an elongated and arcuate rod to define a circle by joining ends of the rod, and has a junction formed from the ends. The seal ring has a radial thickness gradually decreasing from two points that are apart from the junction toward the junction. The points are separated from the junction by an angle of not less than 60 degrees and not more than 150 degrees about a central axis of the circle.

In this aspect, when the seal ring is deployed so as to be in contact with the cylindrical inner peripheral surface of the outer member, the outer peripheral surface of the seal ring very closely approximates a true cylindrical shape, so that the gap between the inner peripheral surface of the outer member and the outer peripheral surface of the seal ring is extremely small. When the seal ring is deployed so as to be in contact with the cylindrical outer peripheral surface of the inner member, the inner peripheral surface of the seal ring very closely approximates a true cylinder shape, so that the gap between the outer peripheral surface of the inner member and the inner peripheral surface of the seal ring is extremely small. Therefore, the sealing ability of the seal ring is remarkably high in both cases.

DETAILED DESCRIPTION

Hereinafter, various embodiments of the present invention will be described with reference to the accompanying drawings. It is of note that the drawings are not necessarily to scale, and certain features may be exaggerated or omitted.

A sealing structure having a seal ring according to each of the embodiments of the present invention described below is used to seal an annular gap between a power transmission shaft and a housing of an automotive vehicle. However, the following description is exemplary, and the sealing structure having a seal ring according to the present invention may be used to seal a liquid such as lubricating oil and cooling water in various oil-hydraulic, water-hydraulic, and pneumatic devices. These devices include, for example, engines, motors, electric power generators, pumps, compressors, power steerings for automotive vehicles, speed reducers for automotive vehicles, transmissions for automotive vehicles, and coolers for automotive vehicles.

First Embodiment

Figure 1:
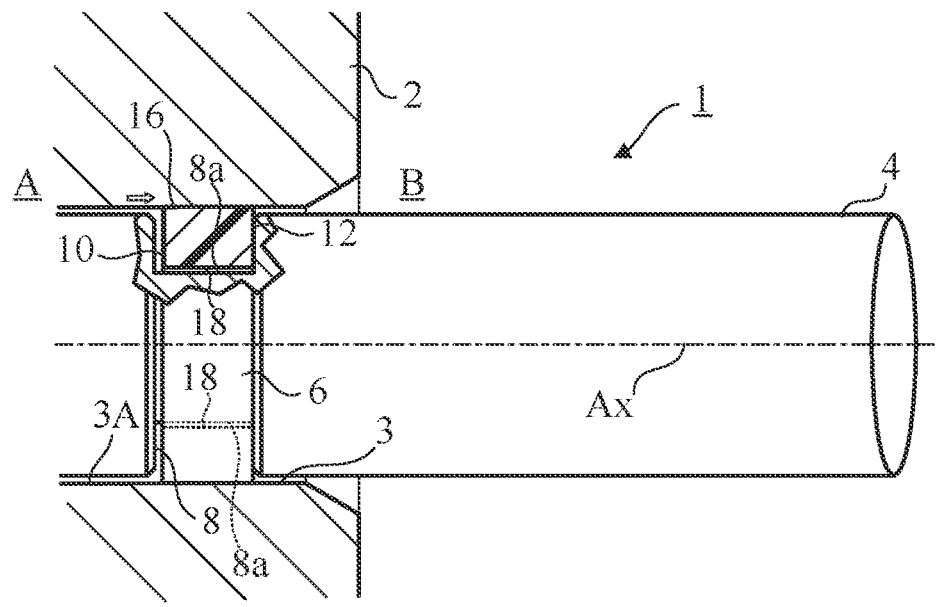
FIG. 1 is a cross-sectional view of a sealing structure having a seal ring according to a first embodiment of the present invention.

As shown in FIG. 1, a sealing structure 1 according to a first embodiment of the present invention includes a housing (outer member) 2, a shaft (inner member) 4, and a seal ring 6. The housing 2 is a stationary member and has a hole 3 having a cylindrical inner peripheral surface 3A and a lubricating oil space (liquid space) A in which a lubricating oil to be sealed is disposed therein. The lubricating oil space A communicates with the hole 3. The shaft 4 is inserted into the lubricating oil space A. The shaft 4 is a rotational shaft that rotates about a central axis Ax, and is a power transmission shaft of an automotive vehicle.

A circumferential groove 8 is formed on the outer peripheral surface of a part of the shaft 4 that is inserted into the hole 3. In the circumferential groove 8, a circular annular seal ring 6 made from a resin is disposed, and as a result, the seal ring 6 is inserted into the hole 3. The seal ring 6 acts for sealing the gap between the shaft 4 and the housing 2 to prevent or reduce leakage of lubricating oil from the lubricating oil space A inside the housing 2 to an external space (atmosphere space) B.

A radial outer portion of the seal ring 6 protrudes radially outward from the circumferential groove 8, and the outer peripheral surface 16 of the seal ring 6 is in contact with the inner peripheral surface 3A of the hole 3. The seal ring 6 is fixed to the hole 3 of the housing 2. Here, "fixed" means that the position of the seal ring 6 is stationary relative the housing 2, and is not intended to limit whether or not the seal ring 6 is non-removably coupled to the housing 2. In this embodiment, the seal ring 6 is press-fitted into the inner surface 3A of the hole 3. Furthermore, as will be described below, the seal ring 6 is secured to the housing 2 by pressure from the lubricating oil inside the seal ring 6.

The seal ring 6 is slidable on the shaft 4 and is disposed in the circumferential groove 8 of the shaft 4. The seal ring 6 isolates the lubricating oil space A from the external space B and confines the lubricating oil within the lubricating oil space A of the housing 2. In the sealing structure 1, the shaft 4 rotates relative to the housing 2 whereas the housing 2 and the seal ring 6 are stationary.

In this embodiment, the seal ring 6 has a rectangular cross-section.

The seal ring 6 is formed from a resin material, such as polyetheretherketone (PEEK), polyphenylene sulfide (PPS), or polytetrafluoroethylene (PTFE). The seal ring 6 may be formed from a resin material containing one of these materials as a base polymer and fillers to improve sliding properties and strength.

Figure 2:
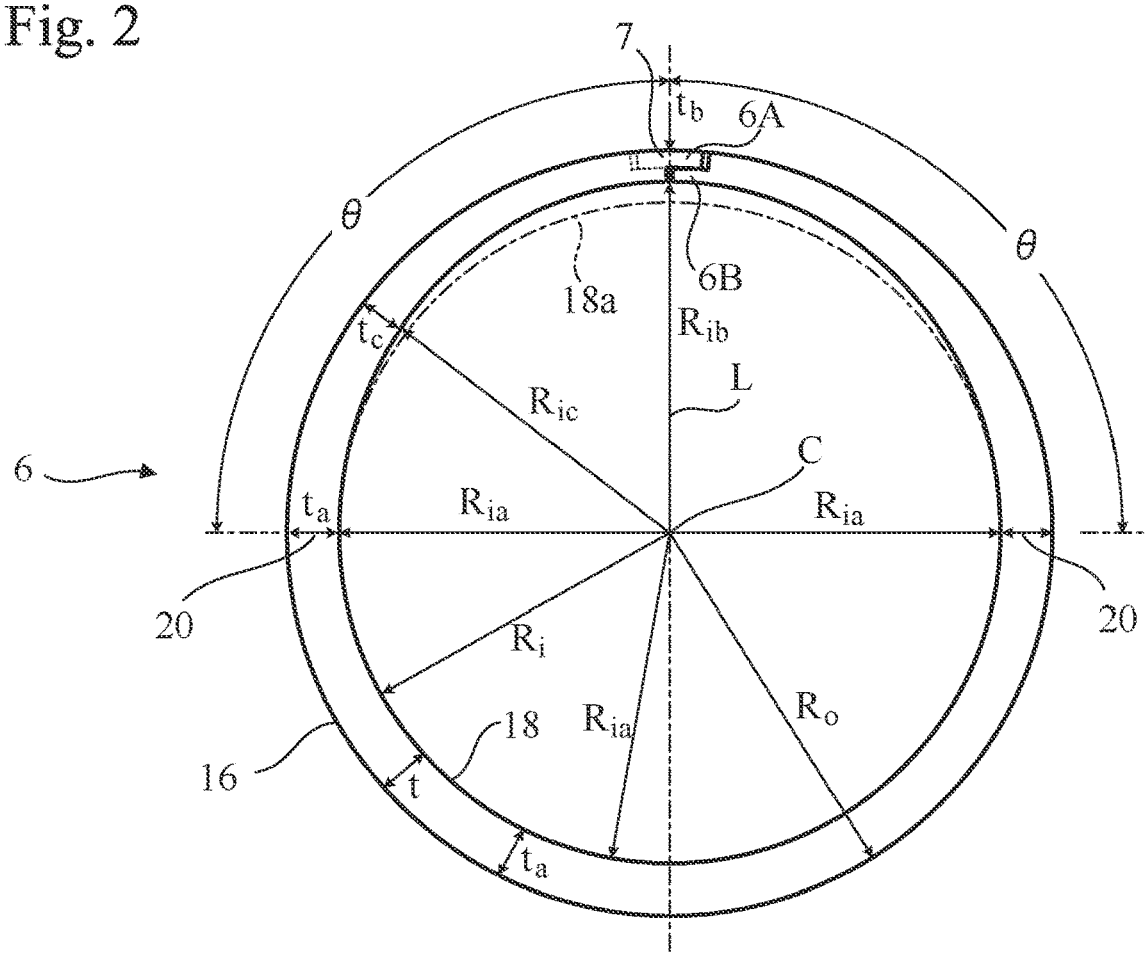
FIG. 2 is a front view of the seal ring according to the first embodiment.

As shown in FIG. 2, the seal ring 6 is formed from an elongated curved arcuate rod having two ends 6A and 6B. Specifically, the seal ring 6 is formed from an elongated arcuate rod to form a circular shape by joining the ends 6A and 6B of the rod. Accordingly, the seal ring 6 has a junction 7 formed from the ends 6A and 6B. Since the seal ring 6 is thus formed from an arcuate rod rather than an endless ring, it is easy to arrange the seal ring 6 around the shaft 4 so as to fit the seal ring 6 into the circumferential groove 8 formed on the outer peripheral surface of the shaft 4.

The shapes of the ends 6A and 6B shown in FIG. 2 are known and are referred to as a special step cut. The special step cut is excellent because it allows circumferential expansion (and thus radial expansion) of the seal ring 6 and still has high sealing ability.

However, the shapes of the ends 6A and 6B shown in FIG. 2 are only examples, and the shapes of the ends of the seal ring 6 are not limited to the special step cut, but may be a step cut, a straight cut, or a bias cut.

Returning to FIG. 1, as described above, the outer peripheral surface of the seal ring 6 is brought into contact with the inner peripheral surface 3A of the hole 3 of the housing 2. Since the seal ring 6 itself exerts an elastic force that causes the seal ring 6 to expand radially, the seal ring 6 is made to adhere to the housing 2. In addition, there is a gap between the inner peripheral surface of the seal ring 6 and the bottom surface 8A of the circumferential groove 8 of the shaft 4. The lubricating oil in the lubricating oil space A can flow through the gap, and the seal ring 6 receives outward pressure from the lubricating oil inside the seal ring 6, so that the seal ring 6 is firmly fixed to the housing 2.

A hydraulic pressure (indicated by an arrow) of the lubricating oil in the lubricating oil space A is applied to the end surface 10 of the seal ring 6 on the side of the lubricating oil space A, so that the seal ring 6 is pushed toward the external space B. Accordingly, the end surface 12 on the side of the external space B of the seal ring 6 is pressed against the wall surface on the side of the external space B of the circumferential groove 8 of the shaft 4. However, lubricating oil enters between the end surface 12 and the wall surface on the side of the external space B of the circumferential groove 8. Accordingly, in a precise sense, the end surface 12 is not in surface contact with the wall surface on the side of the external space B of the circumferential groove 8, and an oil film exists between them.

As shown in FIG. 2, the radial thickness t of the seal ring 6 is not uniform over the entire circumferential direction of the seal ring 6. The thickness t gradually decreases from two points 20 toward the junction 7. Preferably, the two points 20 are at symmetrical positions with respect to a line segment L connecting the central axis C of the outer peripheral surface 16 of the seal ring 6 and the junction 7. The central axis C coincides with the central axis Ax of the shaft 4 and the hole 3 when the seal ring 6 is deployed in the hole 3 of the housing 2.

The two points 20 are the starting points of the change in thickness t and therefore will be referred to as "starting points".

The thickness $t_b$ at the junction 7 is less than the thickness $t_a$ at the starting points 20. The thickness $t_c$ at intermediate points between the starting points 20 and the junction 7 is less than the thickness $t_a$ and greater than the thickness $t_b$. On the other hand, on the opposite side of the junction 7, the thickness t is uniform and equal to the thickness $t_a$ at the starting points 20.

Thus, the thickness $t_b$ is the minimum thickness of the seal ring 6 and the thickness $t_a$ is the maximum thickness of the seal ring 6.

In FIG. 2, the two starting points 20 are 90 degrees apart from the junction 7 about the central axis C of the circular shape. In other words, the angle θ between the starting point 20 and the junction 7 about the central axis C is 90 degrees. However, the angle θ is not limited to 90 degrees, as will be described later.

The outer peripheral surface 16 of the seal ring 6 is cylindrical about the central axis C, and the radius $R_O$ of the outer peripheral surface 16 is uniform over the entire circumferential direction of the seal ring 6.

On the other hand, the radius of curvature $R_i$ of the inner peripheral surface 18 of the seal ring 6 varies around the central axis C. The radius of curvature $R_i$ of the inner peripheral surface 18 gradually increases from the starting points 20 toward the junction 7. The radius of curvature $R_{ib}$ at the junction 7 is greater than the radius of curvature $R_{ia}$ at the starting points 20. The radius of curvature $R_{ic}$ at the intermediate points between the starting points 20 and the junction 7 is greater than the radius of curvature $R_{ia}$ and less than the radius of curvature $R_{ib}$. On the side opposite to the junction 7, the radius of curvature $R_i$ is uniform and equal to the radius of curvature $R_{ia}$ at the starting points 20.

Therefore, the radius of curvature $R_{ib}$ is the maximum radius of curvature of the inner surface 18, and the radius of curvature $R_{ia}$ is the minimum radius of curvature of the inner surface 18.

FIG. 2 shows an imaginary contour 18a of the inner peripheral surface 18 in a phantom line in a case in which the inner peripheral surface 18 of the seal ring 6 is assumed to be a cylindrical shape about the central axis C. On the side of the junction 7 relative to the starting points 20, the inner peripheral surface 18 in this embodiment is located radial outside the imaginary contour 18a.

The seal ring 6 is thus formed so that the thickness t thereof gradually decreases from the points 20, which are apart from the junction 7 by an angle θ, toward the junction 7.

Figure 3:
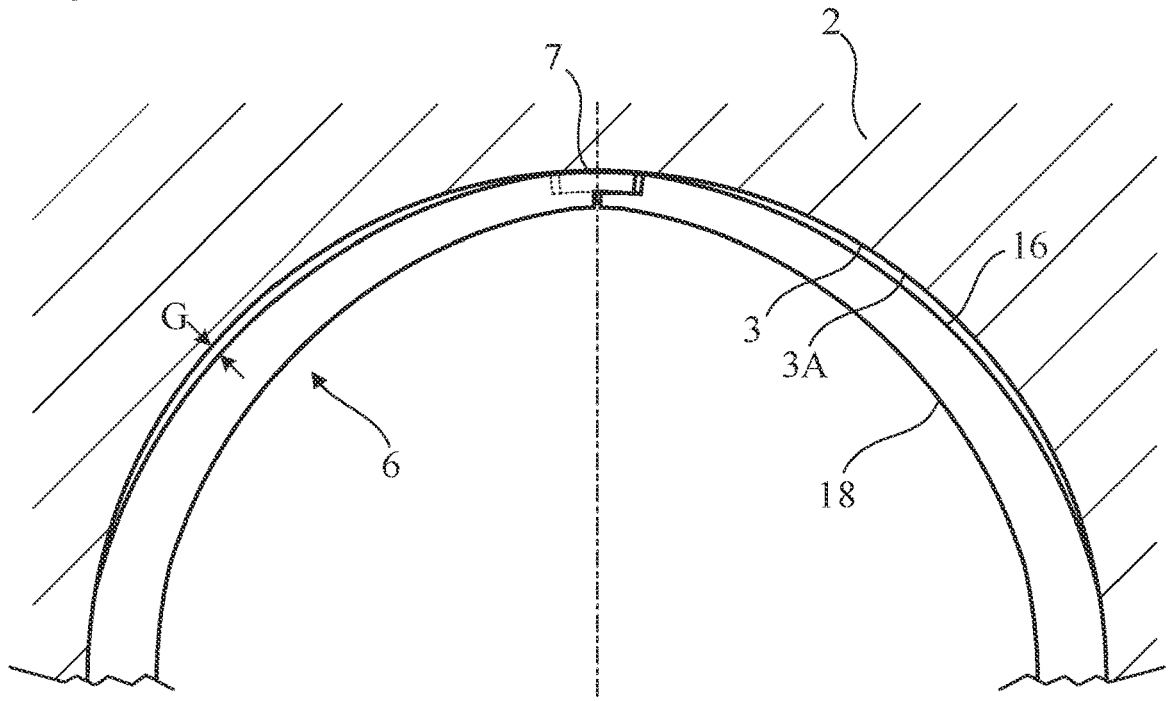
FIG. 3 is an enlarged front view of a part of the seal ring according to the first embodiment deployed within an outer member.

With such a structure, as shown in FIG. 3, when the seal ring 6 is deployed in the inner peripheral surface 3A of the cylindrical hole 3 of the housing 2, the outer peripheral surface of the seal ring 6 is very similar to a true cylinder shape, so that the gap G between the inner peripheral surface 3A of the hole 3 of the housing 2 and the outer peripheral surface 16 of the seal ring 6 is extremely small. Therefore, the sealing ability of the seal ring 6 is remarkably high.

As is clear from FIG. 1, in terms of the sealing ability of the seal ring 6, a gap is allowed between the bottom surface 8A of the circumferential groove 8 of the shaft 4 and the inner peripheral surface 18 of the seal ring 6, and the coaxiality of them and contact of them are not important. In contrast, the contact of the inner surface 3A of the hole 3 of the housing 2 and the outer surface 16 of the seal ring 6 is important for sealing ability.

The applicant conducted a simulation to investigate a suitable range of the angle θ between each starting point 20 and the junction 7. In the simulation, an FEM (Finite Element Method) was used to calculate the maximum value of the gap G between the inner peripheral surface 2A of the housing 2 and the outer peripheral surface of the seal ring 6. The parameters used in the simulation are as follows.

Figure 4:
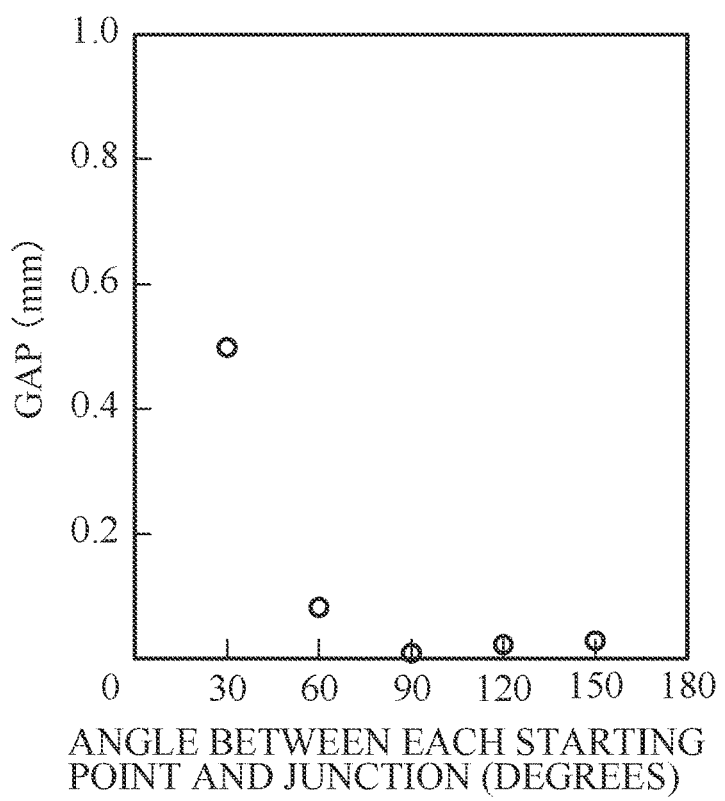
FIG. 4 is a graph showing the relationship between positions of starting points for changing the thickness of the seal ring and the amount of gap between the seal ring and the outer member.

Thickness $t_a$ at the starting points 20: 2.3 mm
Thickness $t_b$ at the junction 7: 1.15 mm
Ratio of the thickness $t_b$ at the junction 7 to the thickness $t_a$ at the starting points 20: 0.5
Outer diameter of the seal ring 6 ($2 \times R_O$): 30 mm In the simulation, the angle θ between each starting point 20 and the junction 7 was varied to 30 degrees, 60 degrees, 90 degrees, 120 degrees, and 150 degrees. FIG. 4 shows the results of the simulation. In FIG. 4, the gap on the vertical axis is the maximum value of the gap G.

As is apparent from FIG. 4, it is preferable that the angle θ be not less than 60 degrees and not more than 150 degrees, and it is more preferable that the angle θ be not less than 80 degrees and not more than 120 degrees. Accordingly, it is preferable that the two starting points 20 be separated from the junction 7 by an angle of not less than 60 degrees and not more than 150 degrees, and it is more preferable that the two starting points 20 be separated from the junction 7 by an angle of not less than 80 degrees and not more than 120 degrees about the central axis C.

Furthermore, the applicant conducted a simulation to investigate a suitable range of the ratio of the thickness $t_b$ at the junction 7 (the minimum value of the thickness t) to the thickness $t_a$ at the starting points 20 (the maximum value of the thickness t). In the simulation, an FEM was also used to calculate the maximum value of the gap G between the inner peripheral surface 2A of the housing 2 and the outer peripheral surface of the seal ring 6. The parameters used in the simulation are as follows.

Figure 5:
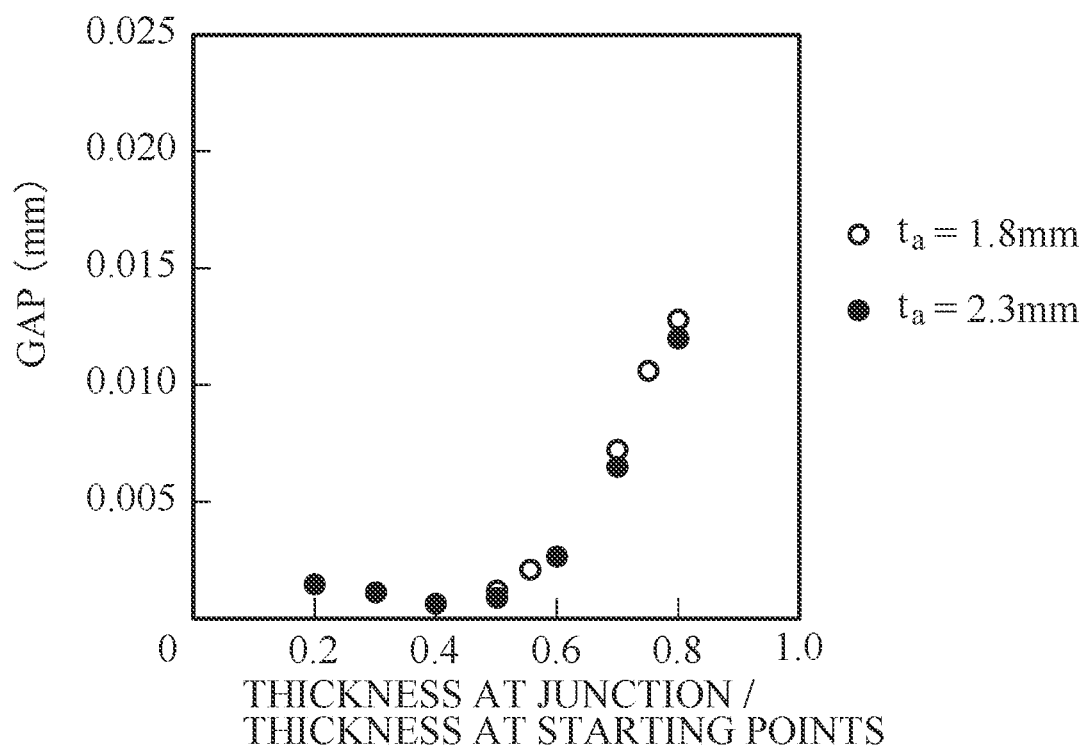
FIG. 5 is a graph showing the relationship between the ratio of the minimum value to the maximum value of the thickness of the seal ring and the amount of gap between the seal ring and the outer member.

Thickness $t_a$ at the starting points 20: 1.8 mm
Thickness $t_a$ at the starting points 20: 2.3 mm
Angle θ between each starting point 20 and the junction 7: 90 degrees
Outer diameter of the seal ring 6 ($2 \times R_O$): 30 mm In the simulation, the ratio of the thickness $t_b$ at the junction 7 to the thickness $t_a$ at the starting points 20 was varied variously. FIG. 5 shows the results of the simulation. In FIG. 5, the gap on the vertical axis is the maximum value of the gap G. When the ratio is 0.4 or less, the calculated values for the thickness $t_a$ of 1.8 mm almost coincide with the calculated values for thickness $t_a$ of 2.3 mm.

As is apparent from FIG. 5, it is preferable that the ratio of the thickness $t_b$ at the junction 7 to the thickness $t_a$ at the starting points 20 be 0.2 or more and 0.6 or less, and it is more preferable that the ratio be 0.3 or more and 0.5 or less.

Second Embodiment

Figure 6:
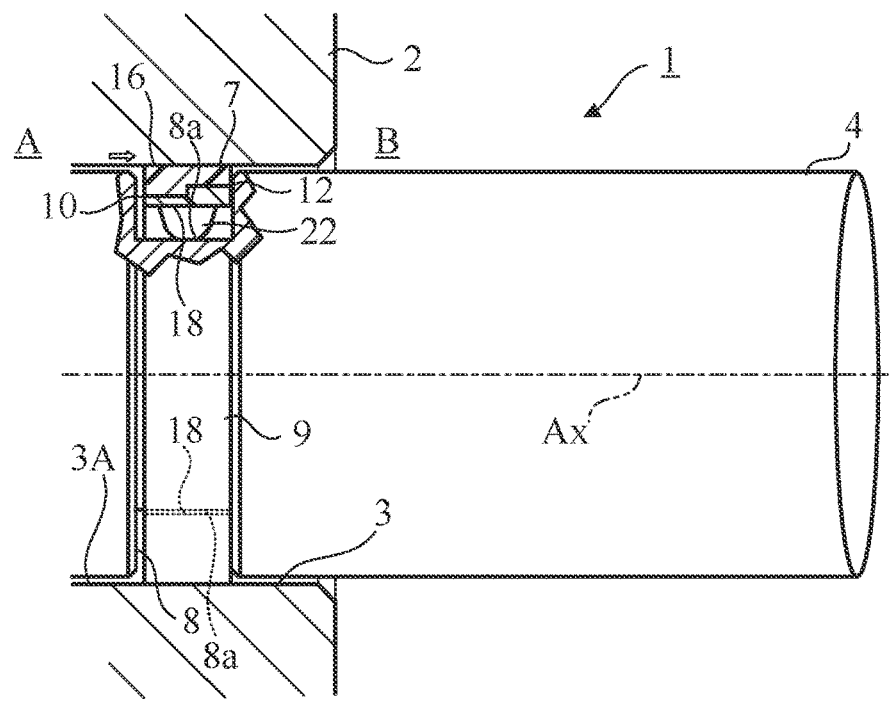
FIG. 6 is a cross-sectional view of a sealing structure having a seal ring according to a second embodiment of the present invention.
Figure 7:
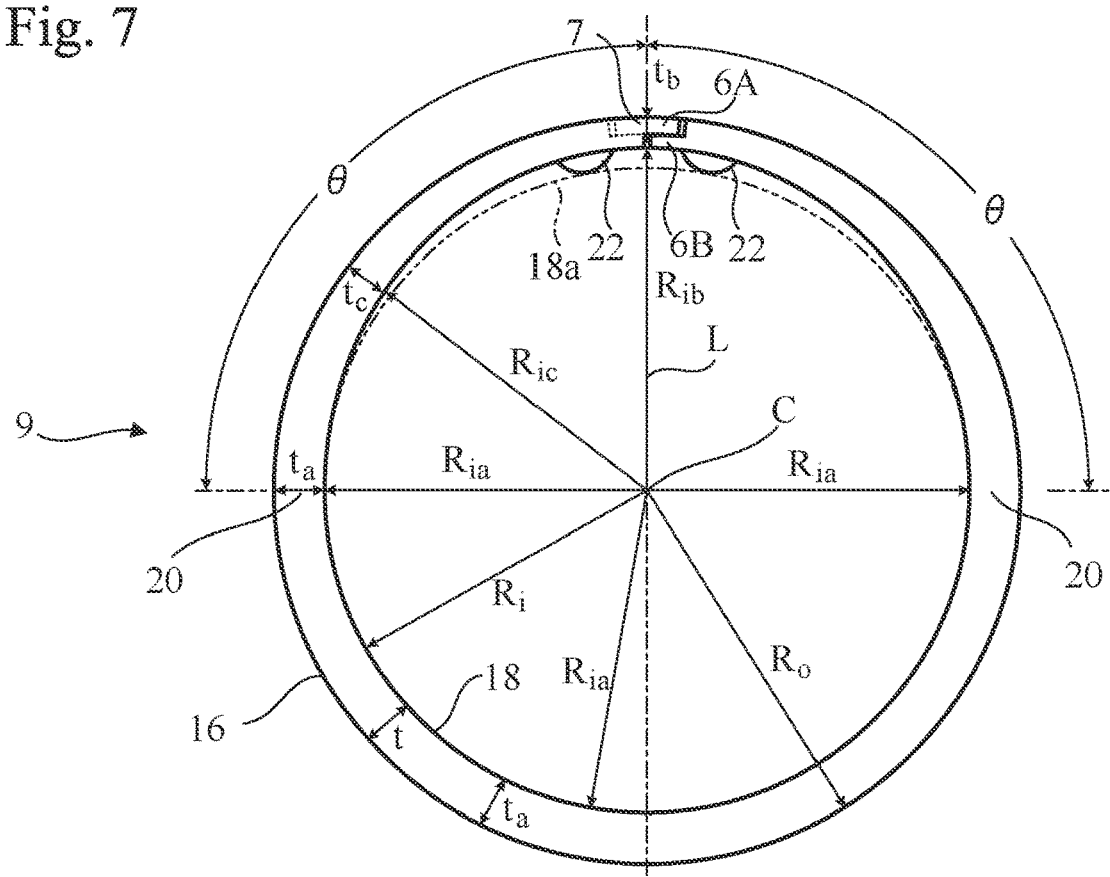
FIG. 7 is front view of the seal ring according to the second embodiment.
Figure 8:
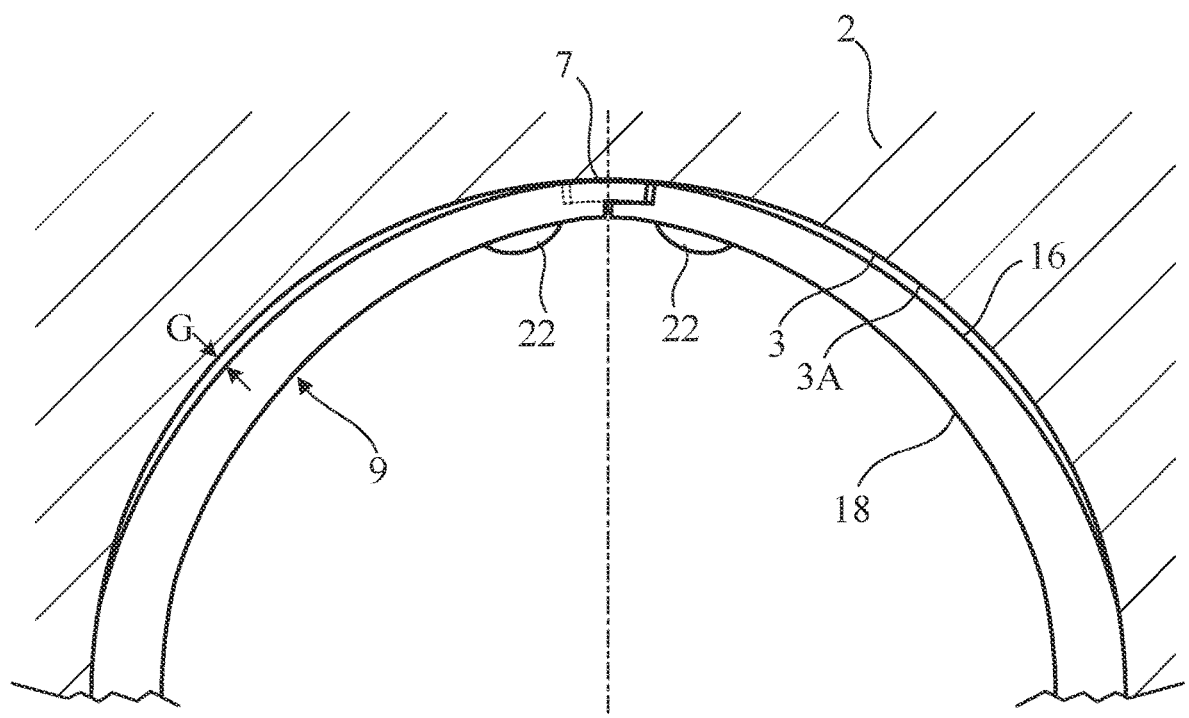
FIG. 8 is an enlarged front view of a part of the seal ring according to the second embodiment deployed within an outer member.

As shown in FIG. 6, a sealing structure 1 according to a second embodiment of the present invention has a seal ring 9. The seal ring 9 has, in addition to the same structure as the seal ring 6 of the sealing structure 1 according to the first embodiment, two protrusions 22 that protrude radially inward from the inner peripheral surface 18. The protrusions 22 are disposed between the two starting points 20. Preferably, the protrusions 22 are disposed in the vicinity of the junction 7. In other words, the distance between each protrusion 22 and the junction 7 is less than the distance between the protrusion 22 and the neighboring starting point 20.

In assembling such a sealing structure, when the seal ring 9 deployed in the circumferential groove 8 on the outer peripheral surface of the shaft 4 is inserted into the hole 3 of the housing 2 together with the shaft 4, it is desirable that the seal ring 9 should not collide with the vicinity of the hole 3 and should not be damaged.

Figure 9:
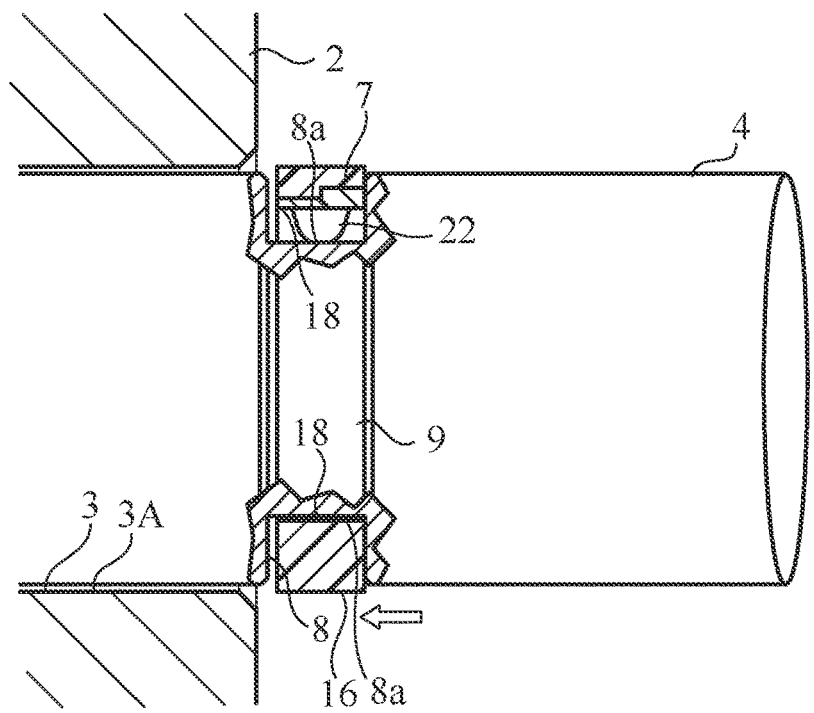
FIG. 9 is a cross-sectional view of elements of the sealing structure according to the second embodiment when assembled.

FIG. 9 is a cross-sectional view of elements of the sealing structure 1 according to the second embodiment when assembled. In the embodiment, since the protrusions 22 are arranged between the two starting points 20, if the seal ring 9 is deployed in the circumferential groove 8 on the outer peripheral surface of the shaft 4 so that the junction 7 is positioned above the shaft 4, the two protrusions 22 protruding from the inner peripheral surface 18 of the seal ring 9 will be brought into contact with the bottom surface 8a of the circumferential groove 8. Since the two protrusions 22 are provided between the two starting points 20, from which the thickness of the seal ring 9 decreases, when the seal ring 9 is deployed in the circumferential groove 8 on the outer peripheral surface of the shaft 4, the outer peripheral surface 16 of the seal ring 9 is arranged substantially concentrically with the circumferential groove 8, and thus with the inner peripheral surface 3A of the hole 3 of the housing 2. Therefore, when inserting the seal ring 9 into the hole 3 of the housing 2, as indicated by the arrow, the seal ring 9 is unlikely to collide with the periphery of the hole 3, thus preventing or reducing damage to the seal ring 9.

Figure 10:
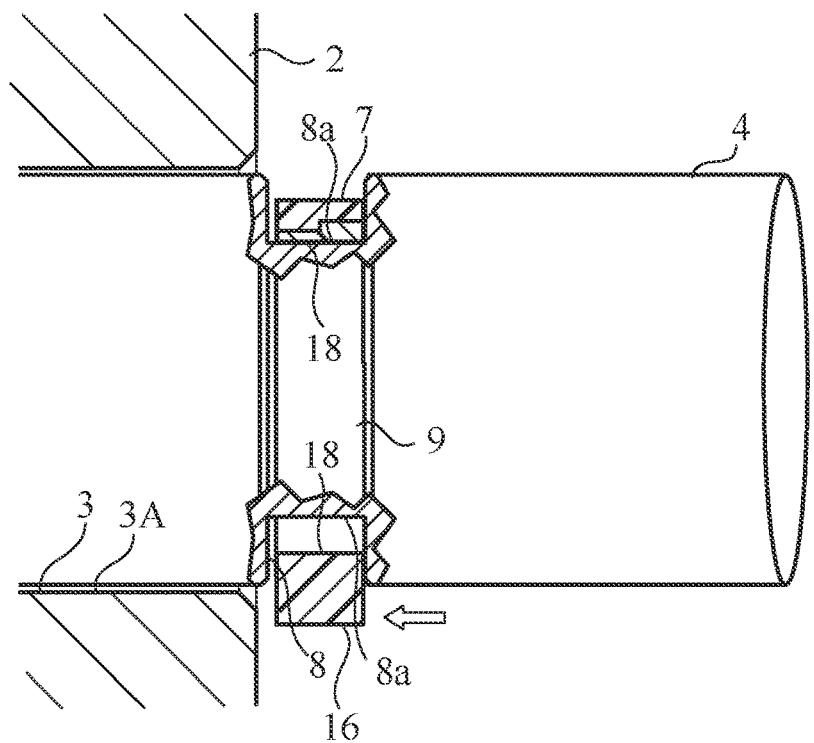
FIG. 10 is a cross-sectional view of elements of a sealing structure according to a comparative example when assembled.

On the other hand, FIG. 10 is a cross-sectional view of elements of a sealing structure according to a comparative example when assembled. In this comparative example, the protrusions 22 are not provided. Therefore, when the seal ring 9 is deployed in the circumferential groove 8 on the outer peripheral surface of the shaft 4 so that the junction 7 is positioned above the shaft 4, the inner peripheral surface 18 of the seal ring 9 is brought into contact with the bottom surface 8a of the circumferential groove 8 in the vicinity of the junction 7, which has the smallest thickness. Therefore, near the lower part of the hole 3, the outer peripheral surface 16 of the seal ring 9 protrudes significantly from the outer peripheral surface of the shaft 4. Therefore, when inserting the seal ring 9 into the hole 3 of the housing 2, as indicated by the arrow, the seal ring 9 easily collides with the periphery of the hole 3, and the seal ring 9 may be damaged.

Figure 11:
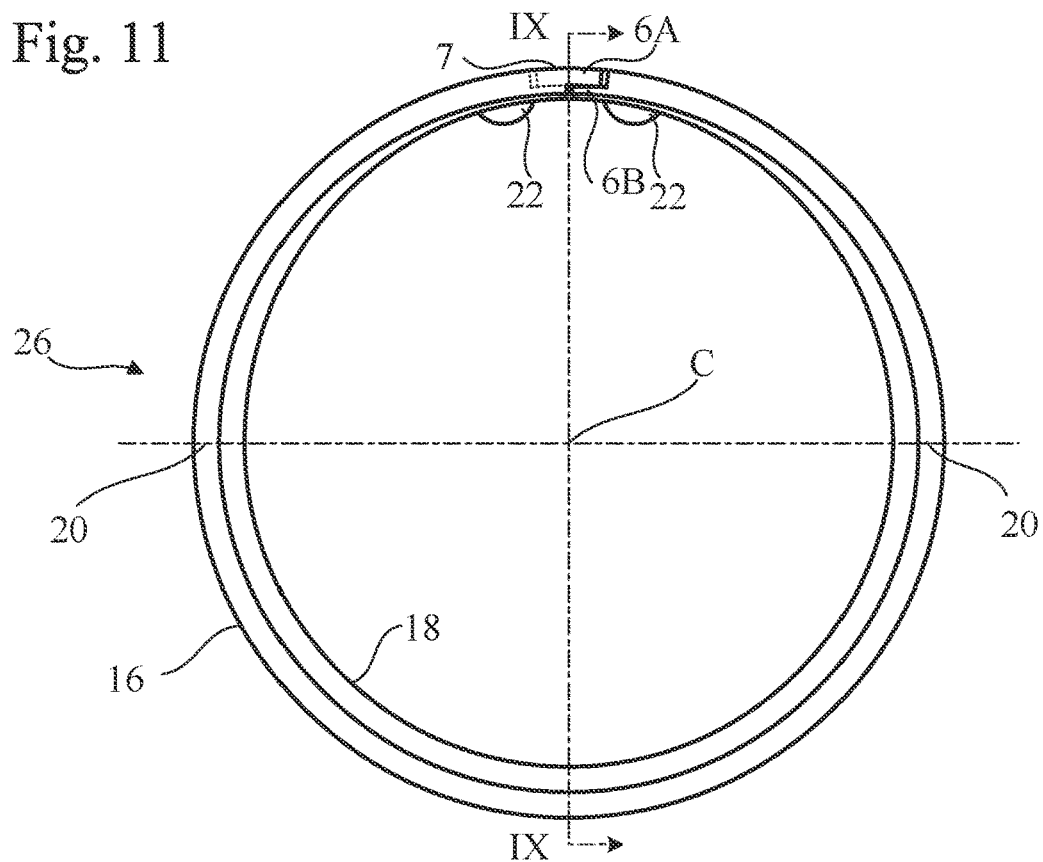
FIG. 11 is a front view of a seal ring according to a modification of the second embodiment.
Figure 12:
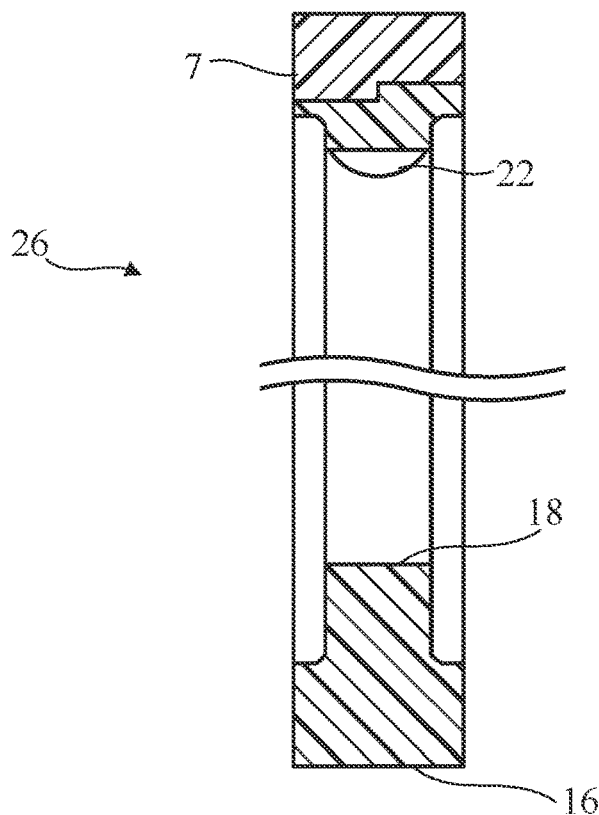
FIG. 12 is a cross-sectional view of the seal ring taken along line IX-IX in FIG. 11.

In the first and second embodiments, as described above, the seal ring 9 has a rectangular cross-section, but the cross-section of the seal ring is not limited to a rectangle. In a seal ring 26 according to a modification shown in FIGS. 11 and 12, the axial length of a radial outer portion is larger, and the axial length of a radial inner portion is smaller. In other words, the axial length of the outer peripheral surface 16 of the seal ring 26, which is to be in contact with the inner peripheral surface 3A of the hole 3 of the housing 2, is greater than the axial length of the inner peripheral surface 18. Thus, the seal ring 26 has a T-shaped cross section.

Figure 13:
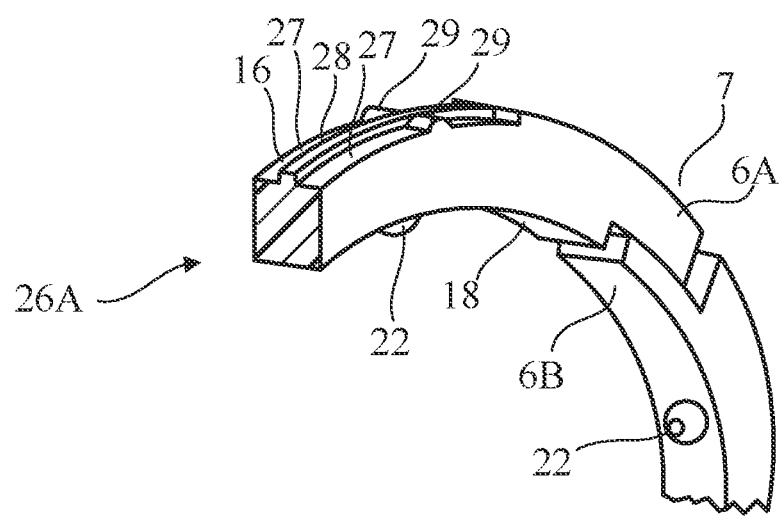
FIG. 13 is a perspective view of a part of a seal ring according to another modification of the second embodiment.

A seal ring 26A according to another modification shown in FIG. 13 also has a T-shaped cross-section. However, in the seal ring 26A, the axial length of the radial outer portion is smaller, and the axial length of the radial inner portion is larger.

In the seal ring 26A, two grooves 27 extending in the circumferential direction are formed on the outer peripheral surface 16 other than the junction 7, and a ridge 28 extending in the circumferential direction is formed between the two grooves 27. The outer peripheral surface of the ridge 28 is smoothly connected to the outer peripheral surface of the junction 7. The outer peripheral surface of the ridge 28 and the outer peripheral surface of the junction 7 constitute the outer peripheral surface 16 of the seal ring 26A and are in contact with the inner peripheral surface 3A of the hole 3 of the housing 2.

Furthermore, multiple ribs 29 are formed in each groove 27 and each rib 29 extends in a direction orthogonal to the ridge 28. In FIG. 13, only one rib 29 is shown in each groove 27, but in each groove 27, multiple ribs 29 are arranged and are spaced apart from one another. The ribs 29 control the flow of lubricating oil inside the grooves 27.

Figure 14:
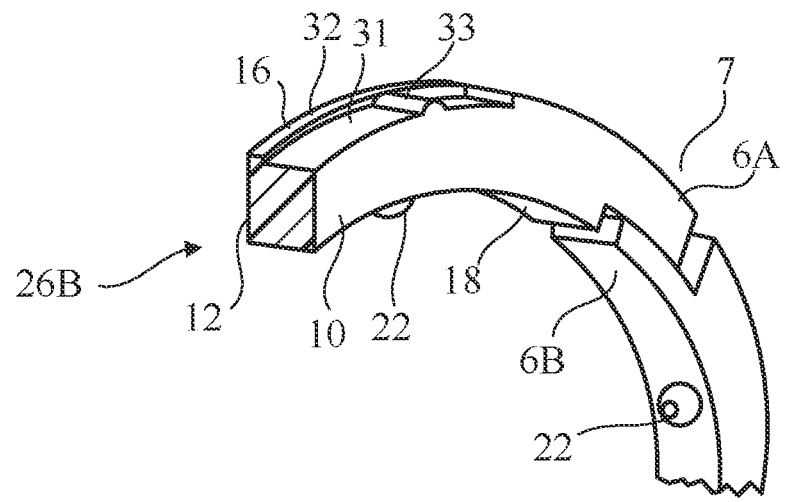
FIG. 14 is a perspective view of a part of a seal ring according to another modification of the second embodiment.

A seal ring 26B according to another modification shown in FIG. 14 has an L-shaped cross-section. The seal ring 26B has a shape in which the ridge 28 of the seal ring 26A shown in FIG. 13 is biased to one side. That is, in the seal ring 26B, a groove 31 extending in the circumferential direction and a ridge 32 extending in the circumferential direction are formed on the outer peripheral surface 16 other than the junction 7. The outer peripheral surface of the ridge 32 is smoothly connected to the outer peripheral surface of the junction 7. The outer peripheral surface of the ridge 32 and the outer peripheral surface of the junction 7 constitute the outer peripheral surface 16 of the seal ring 26B and are in contact with the inner peripheral surface 3A of the hole 3 of the housing 2.

Furthermore, multiple ribs 33 are formed in the groove 31 and each rib 33 extends in a direction orthogonal to the ridge 32 are formed in the groove 31. In FIG. 14, only one rib 33 is shown in the groove 31, but multiple ribs 33 are arranged and spaced apart from one another in the groove 31. The ribs 33 control the flow of lubricating oil inside the groove 31. As is apparent from the end surfaces 10 and 12 shown in FIG. 14, the groove 31 is formed on the side of the atmosphere space B and the ridge 32 are formed on the side of the lubricating oil space A.

As shown in FIGS. 15 to 19, seal rings according to the invention may have more complex shapes.

Figure 15:
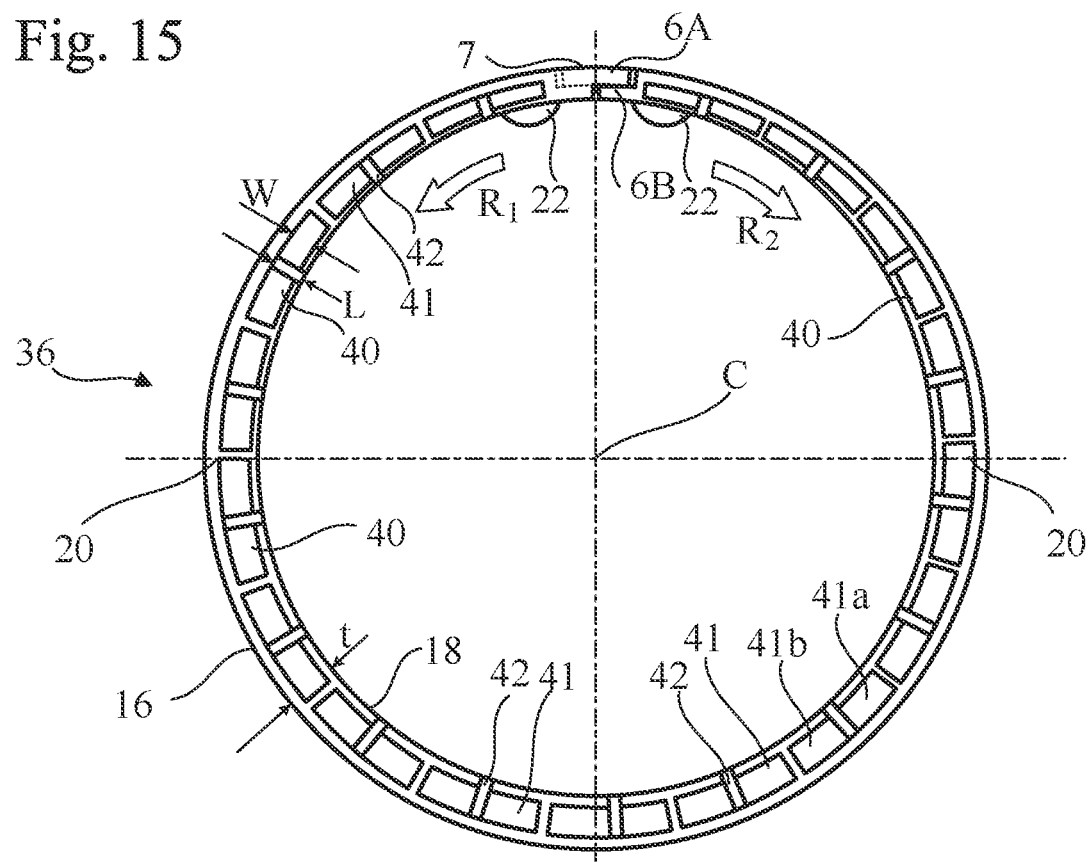
FIG. 15 is a front view of a seal ring according to another modification of the second embodiment.
Figure 16:
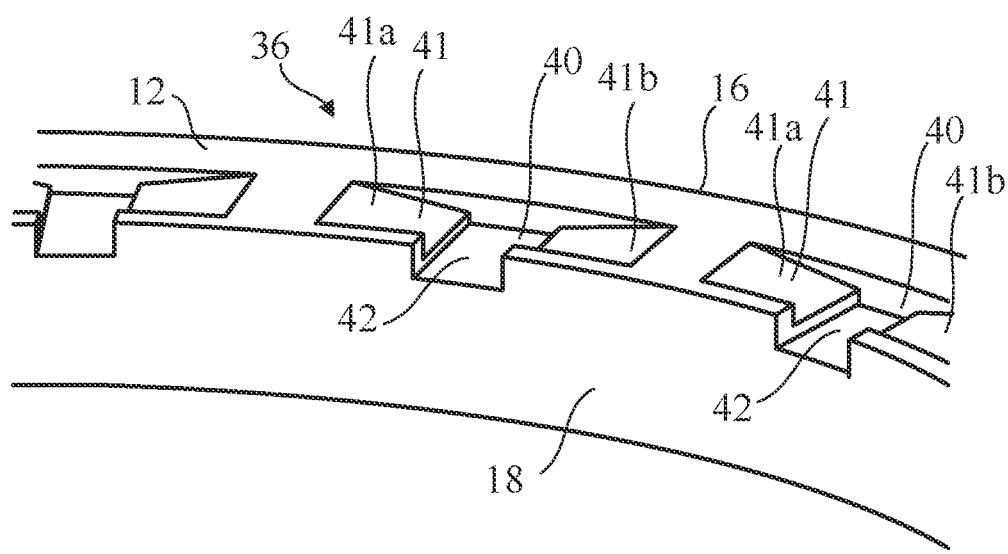
FIG. 16 is an enlarged perspective view of a part of the seal ring of FIG. 15.

A seal ring 36 in another modification shown in FIGS. 15 and 16 has multiple T-shaped grooves 40 formed on the end surface 12 on the side of the atmosphere space B of the seal ring 36 (see FIG. 6). The grooves 40 are spaced apart in a circumferential direction. On the other hand, the end surface 10 on the side of the lubricating oil space A of the seal ring 36 is flat.

Each groove 40 has an arcuate long-groove portion 41 and a short-groove portion 42 that extends from the center of the long-groove portion 41 radially inward and opens at the inner peripheral surface 18, in a manner similar to those disclosed in International Publication WO 2015/111707. As shown in FIG. 16, the depth of the long-groove portion 41 is greater toward the center of the long-groove portion 41. The depth of the short-groove portion 42 is even greater than the depth at the center of the long-groove portion 41.

The end surface 12 on the side of the atmosphere space B of the seal ring 36 is pressed against the wall surface on the side of the atmosphere space B of the circumferential groove 8 of the shaft 4. However, the lubricating oil enters between the end surface 12 and the wall surface on the side of the atmosphere space B of the circumferential groove 8. In this modification, in which the grooves 40 are provided, as the shaft 4 rotates relative to the stationary seal ring 36, the lubricating oil easily enters into an end 41a or 41b of the long-groove portion 41 from the short-groove portion 42. Specifically, when the shaft 4 rotates in the direction $R_1$, the lubricating oil easily enters the end 41a through the short-groove portion 42, and when the shaft 4 rotates in the direction $R_2$, the lubricating oil easily enters the end 41b through the short-groove portion 42.

As a result, an oil film occurs between the end surface 12 and the wall surface on the side of the atmosphere space B of the circumferential groove 8. The thin oil film between the end surface 12 and the wall surface on the side of the atmosphere space B of the circumferential groove 8 reduces the torque given to the shaft 4.

The seal ring 36 is formed so that its thickness t gradually decreases from the two starting points 20 toward the junction 7. As shown in FIG. 15, the width W (length in radial directions of the seal ring 36) of the long-groove portion 41 and the length L (length in radial directions of the seal ring 36) of the short-groove portion 42 also gradually decrease from the two starting points 20 toward the junction 7, in a manner similar to the thickness t.

Figure 17:
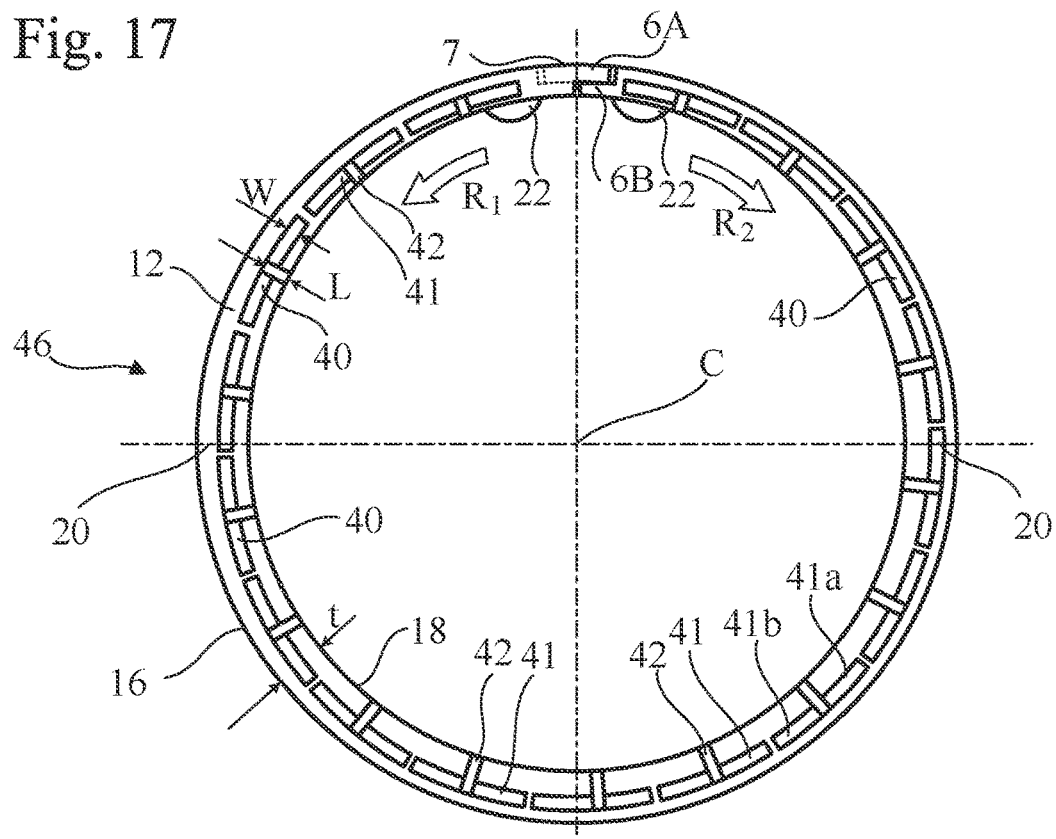
FIG. 17 is a front view of a seal ring according to another modification of the second embodiment.

A seal ring 46 according to a modification shown in FIG. 17 also has multiple T-shaped grooves 40 formed on the end surface 12 on the side of the atmosphere space B of the seal ring 46 (see FIG. 6). The grooves 40 are spaced apart in a circumferential direction. On the other hand, the end surface 10 on the side of the lubricating oil space A of the seal ring 46 is flat. The function of the grooves 40 is the same as described above.

In the modification shown in FIG. 17, the width W (length in radial directions of the seal ring 36) of the long-groove portion 41 is uniform over the entire circumferential direction of the seal ring 46, whereas the length L (length in radial directions of the seal ring 36) of the short-groove portion 42 gradually decreases from the two starting points 20 toward the junction 7, in a manner similar to the thickness t.

Figure 18:
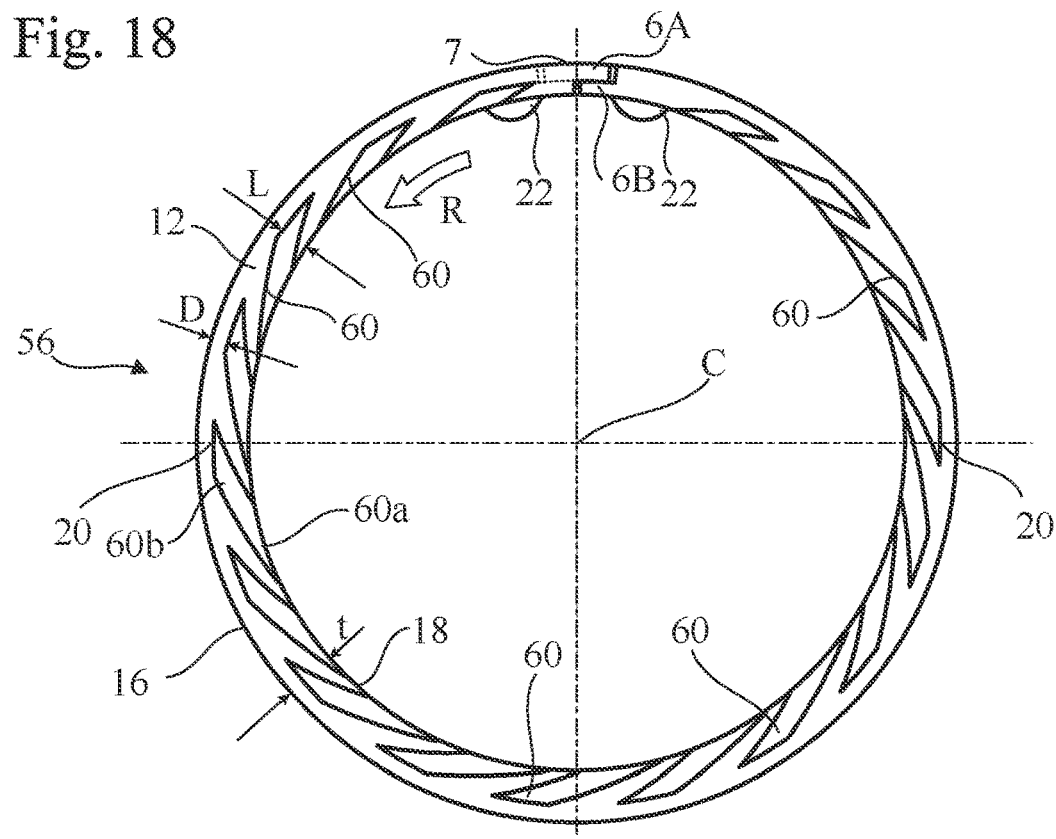
FIG. 18 is a front view of a seal ring according to another modification of the second embodiment.

A seal ring 56 according to another modification shown in FIG. 18 has multiple grooves 60 formed on the end surface 12 on the side of the atmosphere space B of the seal ring 56 (see FIG. 6). The grooves 60 are spaced apart in a circumferential direction. Each groove 60 extends in a spiral shape and opens at the inner peripheral surface 18. On the other hand, the end surface 10 on the side of the lubricating oil space A of the seal ring 56 is flat.

In FIG. 18, arrow R indicates a main rotational direction of the shaft 4 (rotational direction in which the shaft is primarily used). In a case in which the shaft 4 is a power transmission shaft of an automotive vehicle, the main rotational direction of the shaft 4 is the rotational direction of the power transmission shaft when the automotive vehicle moves forward.

It is of note that the main rotational direction may be opposite, depending on whether the seal ring 56 is located on the right or left side of the automotive vehicle. When the main rotational direction is opposite to that in the drawing, orientations of the grooves 60 are also opposite to those in the drawing.

Each groove 60 has an inner end 60a disposed radial inside and an outer end 60b disposed radial outside. The inner end 60a opens at the inner surface 16 of the seal ring 56. The outer end 60b is closed (i.e., surrounded by walls).

Each groove 60 extends from the open inner end 60a to the outer end 60b in a direction opposite to the main rotational direction of the shaft 4, and does not extend from the inner end 60a in the main rotational direction. Accordingly, as the shaft 4 rotates, the pressure at the inner end 60a of the groove 60 becomes lower than that at the outer end 60b, so that the fluid that has entered the groove 60 is discharged.

The end surface 12 on the side of the atmosphere space B of the seal ring 56 is pressed against the wall surface on the side of the atmosphere space B of the circumferential groove 8 of the shaft 4. However, the lubricating oil enters between the end surface 12 and the wall on the side of the atmosphere space B of the circumferential groove 8. The multiple grooves 60 promote the lubricating oil to be discharged from the grooves 60 as the shaft 4 rotates in the main rotational direction R relative to the seal ring 56. This thins the film of lubricating oil to reduce the shear resistance of oil and also promotes air in the lubricating oil to vaporize by cavitation to form a film of air occupying almost the entire area in each groove 60. Air forming the film of air is also discharged from the grooves 60, but as long as the shaft 4 continues to rotate in the main rotational direction R, cavitation generates air bubbles one after another, so that the film of air persists in the grooves 60. The thin film of oil and air between the end surface 12 and the wall on the side of the atmosphere space B of the circumferential groove 8 reduces the torque given to the shaft 4.

Figure 19:
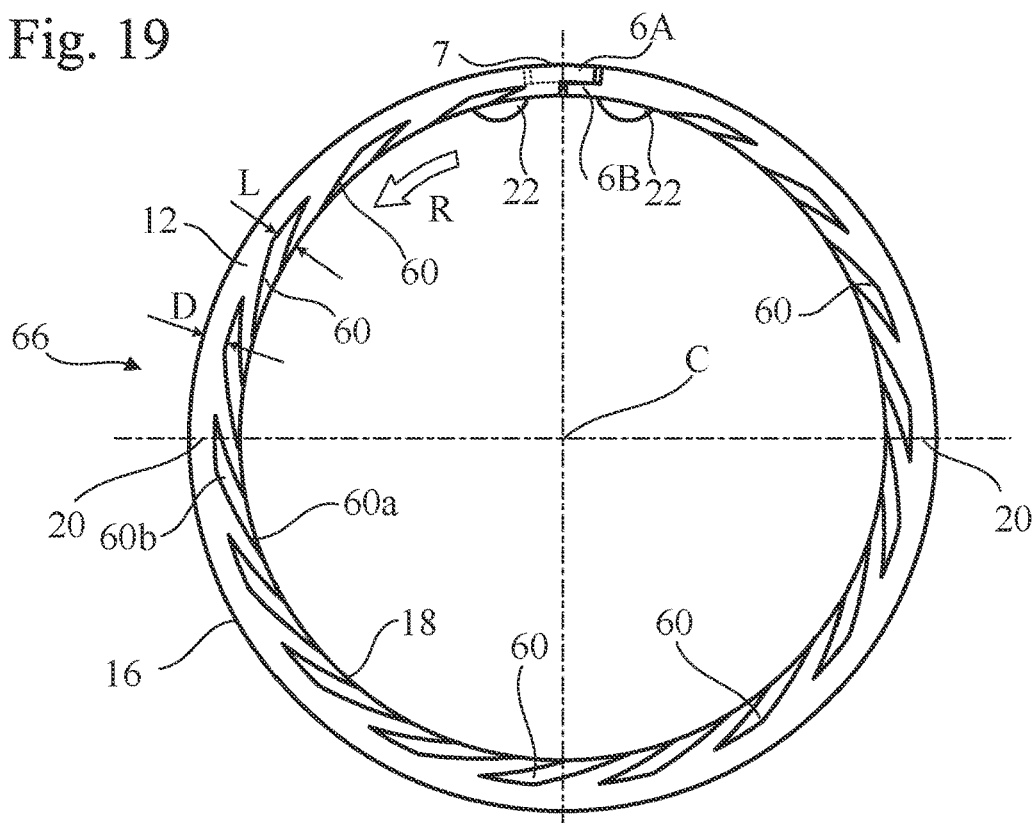
FIG. 19 is a front view of a seal ring according to another modification of the second embodiment.

A seal ring 66 according to another modification shown in FIG. 19 also has multiple grooves 60 formed on the end surface 12 on the side of the atmosphere space B of the seal ring 66 (see FIG. 6). The grooves 60 are spaced apart in a circumferential direction. Each groove 60 extends in a spiral shape and opens at the inner peripheral surface 18. On the other hand, the end surface 10 on the side of the lubricating oil space A of the seal ring 66 is flat. The function of the grooves 60 is the same as described above.

As shown in FIGS. 18 and 19, the length L (length in radial directions of the seal ring) of the groove 60 gradually decreases from the two starting points 20 toward the junction 7, in a manner similar to the thickness t of the seal ring. However, in FIG. 18, the distance D between the outer end 60b of the groove 60 and the outer peripheral surface 16 of the seal ring is uniform over the entire circumferential direction, whereas in FIG. 19, the distance D between the outer end 60b of the groove 60 and the outer peripheral surface 16 of the seal ring decreases gradually from the two starting points 20 toward the junction 7. Thus, the rate of decrease of the length L of the grooves 60 in FIG. 18 is different from that in FIG. 19.

Third Embodiment

Figure 20:
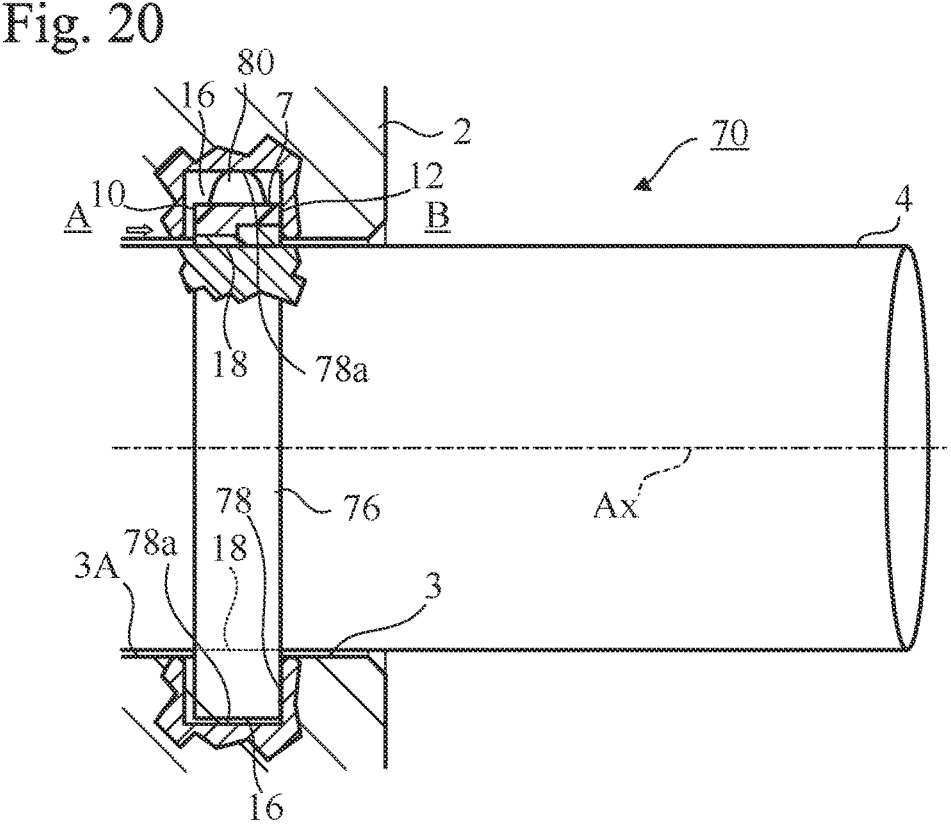
FIG. 20 is a cross-sectional view of a sealing structure having a seal ring according to a third embodiment of the present invention.

As shown in FIG. 20, a sealing structure 70 according to a third embodiment of the present invention has a housing (outer member) 2, a shaft (inner member) 4, and a seal ring 76. The housing 2 is a stationary member and has a hole 3 having a cylindrical inner peripheral surface 3A and a lubricating oil space (liquid space) A in which a lubricating oil to be sealed is disposed inside. The lubricating oil space A communicates with the hole 3.

A shaft 4 is inserted into the lubricating oil space A. The shaft 4 is inserted into the hole 3. The shaft 4 is a rotational shaft that rotates about a central axis Ax, and is a power transmission shaft of an automotive vehicle.

In this embodiment, a circumferential groove 78 is formed on the inner peripheral surface 3A of the hole 3 of the housing 2 instead of the circumferential groove 8 of the shaft 4. A circular annular seal ring 76 made from a resin is disposed in the circumferential groove 78, and the shaft 4 is inserted into the seal ring 76. The seal ring 76 acts for sealing a gap between the shaft 4 and the housing 2 to prevent or reduce leakage of lubricating oil from the lubricating oil space A inside the housing 2 to the atmosphere space B.

A radial inner portion of the seal ring 76 protrudes radially inward from the circumferential groove 78, and the inner peripheral surface 18 of the seal ring 76 is in contact with the outer peripheral surface of the shaft 4. The seal ring 76 is fixed to the shaft 4. Here, "fixed" means that the position of the seal ring 76 is stationary relative to the shaft 4, and is not intended to limit whether or not the seal ring 76 is non-removably coupled to the shaft 4. In this embodiment, the shaft 4 is press-fitted in the seal ring 76. Furthermore, as will be described below, the seal ring 76 is secured to the shaft 4 by pressure from lubricating oil outside the seal ring 76.

The seal ring 76 is slidable on the housing 2 and is disposed in the circumferential groove 78 of the housing 2. The seal ring 76 isolates the lubricating oil space A from the atmosphere space B and confines the lubricating oil within the lubricating oil space A of the housing 2. In the sealing structure 70, whereas the housing 2 and the seal ring 76 are stationary, the shaft 4 rotates relative to the housing 2. Accordingly, the seal ring 76 also rotates with the shaft 4.

In this embodiment, the seal ring 76 has a rectangular cross-section. The seal ring 76 is formed from the same material as that for the seal ring 6 of the first and second embodiments.

Figure 21:
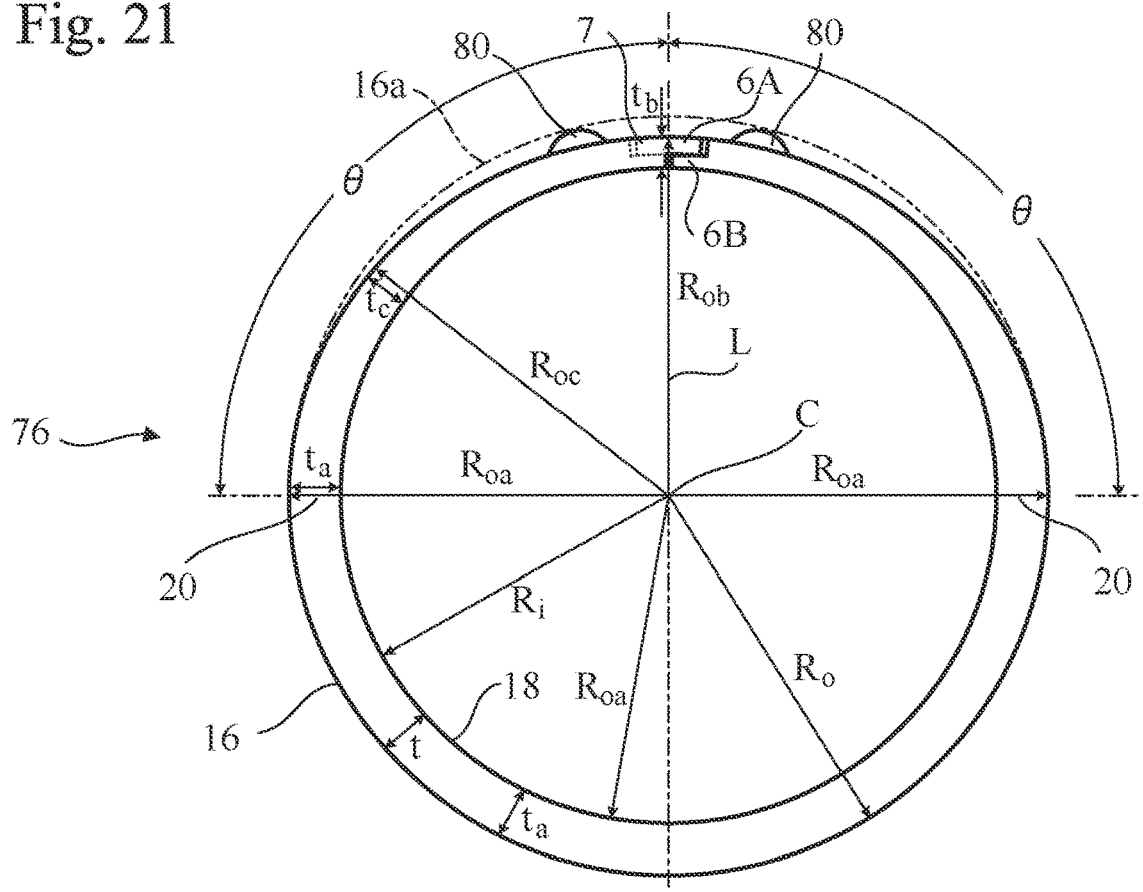
FIG. 21 is a front view of the seal ring according to the third embodiment of the present invention.

As shown in FIG. 21, the seal ring 76 is formed from an elongated curved arcuate rod to form a circle by joining the ends 6A and 6B of the rod. Accordingly, the seal ring 76 has a junction 7 formed from the ends 6A and 6B. Since the seal ring 76 is thus formed from an arcuate rod rather than an endless ring, it is easy to fit the seal ring 76 into the circumferential groove 78 formed on the inner peripheral surface 3A of the hole 3 of the housing 2 and to place the seal ring 76 around the shaft 4.

The shapes of the ends 6A and 6B shown in FIG. 21 are a special step cut, but the shapes of the ends of the seal ring 76 are not limited to the special step cut, and may be a step cut, a straight cut, or a bias cut.

Returning to FIG. 20, as described above, the inner peripheral surface 18 of the seal ring 76 is brought into contact with the outer peripheral surface of the shaft 4. There is a gap between the outer peripheral surface 16 of the seal ring 76 and the bottom surface 78a of the circumferential groove 78 of the inner surface 3A of the hole 3 of the housing 2. The lubricating oil in the lubricating oil space A can flow through the gap, and the seal ring 76 receives outward pressure from the lubricating oil inside the seal ring 76, so that the seal ring 76 is firmly fixed to the housing 2.

A hydraulic pressure (indicated by an arrow) of the lubricating oil in the lubricating oil space A is applied to the end surface 10 of the seal ring 76 on the side of the lubricating oil space A, so that the seal ring 76 is pushed toward the atmosphere space B. Accordingly, the end surface 12 on the side of the atmosphere space B of the seal ring 76 is pressed against the wall surface on the side of the atmosphere space B of the circumferential groove 78 of the inner surface 3A of the hole 3 of the housing 2. However, lubricating oil enters between the end surface 12 and the wall surface on the side of the atmosphere space B of the circumferential groove 78. Accordingly, in a precise sense, the end surface 12 is not in surface contact with the wall surface on the side of the atmosphere space B of the circumferential groove 78, and an oil film exists between them.

As shown in FIG. 21, in this embodiment, the radial thickness t of the seal ring 76 is not uniform over the entire circumferential direction of the seal ring 76. In a manner similar to the first and second embodiments, the thickness t gradually decreases from two points (starting points) 20 towards the junction 7. Preferably, the two points 20 are at symmetrical positions with respect to a line segment L connecting the central axis C of the outer peripheral surface 16 of the seal ring 76 and the junction 7. The central axis C coincides with the central axis Ax of the shaft 4 and the hole 3 when the seal ring 76 is deployed in the hole 3 of the housing 2.

The thickness $t_a$ at the junction 7 is less than the thickness $t_a$ at the starting points 20. The thickness $t_c$ at intermediate points between the starting point 20 and the junction 7 is less than the thickness $t_a$ and greater than the thickness $t_b$. On the other hand, on the opposite side of the junction 7, the thickness t is uniform and equal to the thickness $t_a$ at the starting points 20.

Thus, the thickness $t_b$ is the minimum thickness of the seal ring 76 and the thickness $t_a$ is the maximum thickness of the seal ring 76.

In FIG. 21, the two starting points 20 are 90 degrees apart from the junction 7 about the central axis C of the circular shape. In other words, the angle θ between the starting point 20 and the junction 7 about the central axis C is 90 degrees. However, the angle θ is not limited to 90 degrees.

From the simulation results concerning the first embodiment, in the third embodiment as well, it is analogized that the angle θ is preferably not less than 60 degrees and not more than 150 degrees, and is more preferably not less than 80 degrees and not more than 120 degrees. Therefore, it is preferable that the two starting points 20 be separated from the junction 7 by an angle of not less than 60 degrees and not more than 150 degrees, and it is more preferable that the two starting points 20 be separated from the junction 7 by an angle of not less than 80 degrees and not more than 120 degrees about the central axis C.

From the simulation results concerning the first embodiment, in the third embodiment as well, it is analogized that the ratio of the thickness $t_b$ at the junction 7 to the thickness $t_a$ at the starting points 20 is preferably 0.2 or more and 0.6 or less, and is more preferably 0.3 or more and 0.5 or less.

The seal ring 76 further has two protrusions 80 protruding radially outward from the outer peripheral surface 16. The protrusions 80 are disposed between the two starting points 20. Preferably, the protrusions 80 are disposed in the vicinity of the junction 7. In other words, the distance between the protrusion 80 and the junction 7 is less than the distance between the protrusion 80 and the neighboring starting point 20.

The inner peripheral surface 18 of the seal ring 76 is cylindrical about the central axis C, and the radius $R_i$ of the inner peripheral surface 18 is uniform over the entire circumferential direction of the seal ring 76.

On the other hand, the radius of curvature $R_O$ of the outer peripheral surface 16 of the seal ring 76 varies around the central axis C. The radius of curvature $R_O$ of the outer peripheral surface 16 gradually decreases from the starting points 20 toward the junction 7. The radius of curvature $R_{ob}$ at the junction 7 is less than that of $R_{oa}$ at the starting points 20. The radius of curvature $R_{oc}$ at the intermediate points between the starting points 20 and the junction 7 is less than the radius of curvature $R_{oa}$ and greater than the radius of curvature $R_{ob}$. On the side opposite to the junction 7, the radius of curvature $R_O$ is uniform and equal to the radius of curvature $R_{oa}$ at the starting points 20.

Therefore, the radius of curvature $R_{ob}$ is the minimum radius of curvature of the outer surface 16, and the radius of curvature $R_{oa}$ is the maximum radius of curvature of the outer surface 16.

FIG. 21 shows an imaginary contour 16a of the outer peripheral surface 16 in a phantom line in a case in which the outer peripheral surface 16 of the seal ring 76 is assumed to be a cylindrical shape about the central axis C. On the side of the junction 7 relative to the starting points 20, the outer peripheral surface 16 in this embodiment is located radial inside the imaginary contour 16a.

The seal ring 76 is thus formed so that the thickness t thereof gradually decreases from the point 20, which are apart from the junction 7 by an angle θ, toward the junction 7.

With such a structure, when the seal ring 76 is deployed in the circumferential groove 78 of the inner surface 3A of the hole 3 of the housing 2, the inner surface 18 of the seal ring 76 is very similar to a true cylinder shape, so that the gap between the outer surface of the shaft 4 and the inner surface 18 of the seal ring 76 is extremely small. Therefore, the sealing ability of the seal ring 76 is remarkably high.

As is clear from FIG. 20, a gap is allowed between the bottom surface 78a of the circumferential groove 78 of the inner surface 3A of the hole 3 of the housing 2 and the outer peripheral surface 16 of the seal ring 76, and the coaxiality of them and contact of them are not important. In contrast, the contact of the outer peripheral surface of the shaft 4 and the inner peripheral surface 18 of the seal ring 76 is important for sealing ability.

Figure 22:
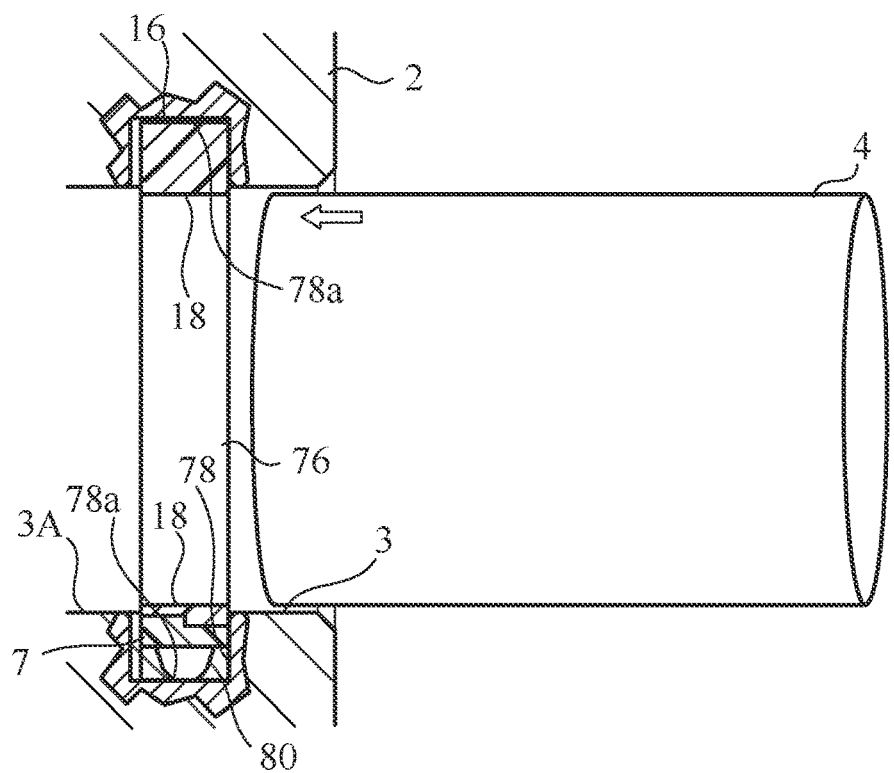
FIG. 22 is a cross-sectional view of elements of the sealing structure according to the third embodiment when assembled.

FIG. 22 is a cross-sectional view of elements of the sealing structure 70 of the third embodiment when assembled. In the embodiment, since the protrusions 80 are arranged between the two starting points 20, if the seal ring 76 is deployed in the circumferential groove 78 on the inner surface 3A of the hole 3 of the housing 2 so that the junction 7 is positioned below the shaft 4, the two protrusions 80 protruding from the outer peripheral surface 16 of the seal ring 76 will be brought into contact with the bottom surface 78a of the circumferential groove 78. Since the two protrusions 80 are provided between two starting points 20, from which the thickness of the seal ring 76 decreases, when the seal ring 76 is deployed in the circumferential groove 78 on the inner surface 3A of the hole 3 in the housing 2, the inner peripheral surface 18 of the seal ring 76 is arranged substantially concentrically with the circumferential groove 78, and thus with the outer peripheral surface of the shaft 4. Therefore, as indicated by the arrow, when the shaft 4 is inserted into the seal ring 76, the shaft 4 is unlikely to collide with the seal ring 76, thus preventing or reducing damage to the seal ring 76.

Figure 23:
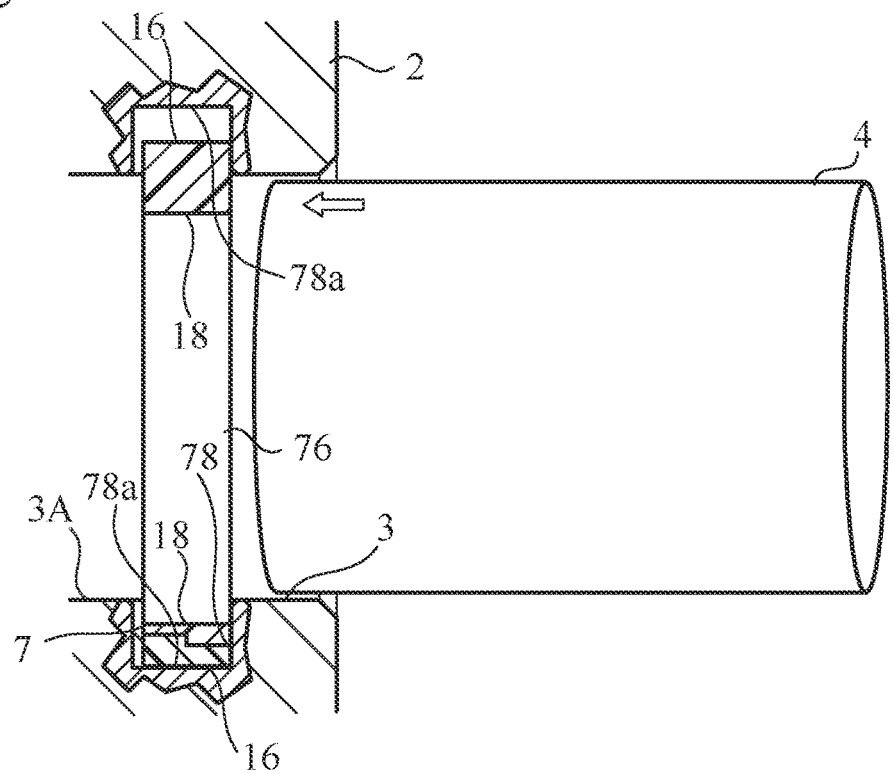
FIG. 23 is a cross-sectional view of elements of a sealing structure according to a comparative example when assembled.

On the other hand, FIG. 23 is a cross-sectional view of elements of a sealing structure for a comparative example when assembled. In this comparative example, the protrusions 80 are not provided. Therefore, when the seal ring 76 is deployed in the circumferential groove 78 on the inner surface 3A of the hole 3 of the housing 2 so that the junction 7 is positioned below the shaft 4, the outer peripheral surface 16 of the seal ring 76 is brought into contact with the bottom surface 78a of the circumferential groove 78 in the vicinity of the junction 7, which has the smallest thickness. Therefore, near the upper part of the hole 3, the seal ring 76 protrudes significantly from the circumferential groove 78. Therefore, when the shaft 4 is inserted into the seal ring 76 as indicated by the arrow, the shaft 4 easily collides with the seal ring 76, and the seal ring 76 may be damaged.

Figure 24:
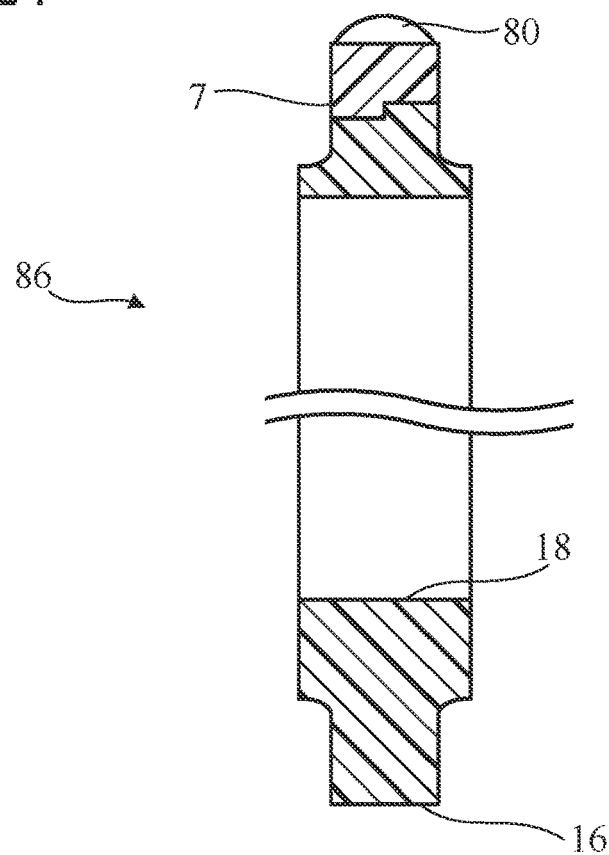
FIG. 24 is a front view of a seal ring according to a modification of the third embodiment.

In the third embodiment, as described above, the seal ring 76 has a rectangular cross-section, but the cross-section of the seal ring is not limited to a rectangle. In a seal ring 86 according to a modification shown in FIG. 24, the axial length of the radial inner portion is larger, and the axial length of the radial outer portion is smaller. In other words, the axial length of the inner peripheral surface 18 of the seal ring 86, which is to be in contact with the outer peripheral surface of the shaft 4, is greater than the axial length of the outer peripheral surface 16. Thus, the seal ring 86 has a T-shaped cross-section.

Although detailed illustrations are omitted, a seal ring of a shape in which the inner and outer perimeters of the seal ring 26A of FIG. 13 are reversed, as well as a seal ring of a shape in which the inner and outer perimeters of the seal ring 26B of FIG. 14 are reversed, are also contemplated.

Although detailed illustrations are omitted, multiple grooves similar to the grooves 40 shown in FIG. 15 to 17 or multiple grooves similar to the grooves 60 shown in FIG. 18 or 19 may be formed on the end surface 12 (see FIG. 20) on the side of the atmosphere space B of the seal ring 76. However, whereas the grooves 40 and 60 in the modifications of the second embodiment open at the inner peripheral surface 18 of the seal ring, in a case in which similar grooves are formed in the third embodiment, the grooves open at the outer peripheral surface 16 of the seal ring.

The present invention has been shown and described with reference to preferred embodiments thereof. However, it will be understood by those skilled in the art that various changes in form and detail may be made without departing from the scope of the invention as defined by the claims. Such variations, alterations, and modifications are intended to be encompassed in the scope of the present invention.

For example, in the above embodiments, the housing 2, which is the outer member, and the seal ring are stationary, whereas the shaft 4, which is the inner member, rotates relative to the housing 2. However, the seal ring may be arranged between a fixed inner member and a rotating outer member, and may be fixed, e.g., press-fitted to the inner surface of the rotating outer member.

In FIG. 1, the end surfaces 10 and 12 of the seal ring 6 are depicted as flat surfaces, but at least one of the end surfaces 10 and 12 may have multiple grooves in a manner similar to the grooves 40 shown in FIG. 15 to 17 or the grooves 60 shown in FIG. 18 or 19, or may have multiple holes.

Although not shown, in the first and second embodiments and modifications thereof, another ring formed from an elastic material (e.g., an elastomer) may be disposed between the bottom surface 8a of the circumferential groove 8 of the shaft 4 and the inner peripheral surface 18 of the seal ring 6, 9, 26, 26A, 26B, 36, 46, 56, or 66. In this case, the seal ring receives outward pressure from the elastic ring inside the seal ring.

Although not shown, in the third embodiment and modifications thereof, another ring formed from an elastic body (e.g., an elastomer) may be disposed between the bottom surface 78a of the circumferential groove 78 in the hole 3 of the housing 2 and the outer peripheral surface 16 of the seal ring 76 or 86. In this case, the seal ring receives inward pressure from the elastic body ring outside the seal ring.

In the second embodiment and modifications thereof, the number of protrusions 22 is not limited to two, but may be three or more. In the third embodiment and modifications thereof, the number of protrusions 80 is not limited to two, but may be three or more.

Aspects of the present invention are also set out in the following numbered clauses:

Clause 1. A circular annular seal ring made from a resin and adapted to be disposed between an outer member and an inner member that rotate relative to each other, the seal ring being formed from an elongated and arcuate rod to define a circle by joining ends of the rod, the seal ring having:
 a junction formed from the ends; and
 a radial thickness gradually decreasing from two points that are apart from the junction toward the junction,
 the points being separated from the junction by an angle of not less than 60 degrees and not more than 150 degrees about a central axis of the circle.

Clause 2. The seal ring according to clause 1, wherein the points are apart from the junction by an angle of not less than 80 degrees and not more than 120 degrees about the central axis of the circle.

Clause 3. The seal ring according to clause 1 or 2, wherein a ratio of the thickness at the junction to the thickness at the points is not less than 0.2 and not more than 0.6.

Clause 4. The seal ring according to any one of clauses 1 to 3, wherein a ratio of the thickness at the junction to the thickness at the points is not less than 0.3 and not more than 0.5.

Clause 5. The seal ring according to any one of clauses 1 to 4, wherein the outer member has a hole having a cylindrical inner peripheral surface and a liquid space communicating with the hole and containing a liquid disposed therein, and wherein
the inner member is disposed in the liquid space and is inserted into the hole,
the inner member having an outer peripheral surface having a circumferential groove,
the seal ring being adapted to be inserted into the hole of the outer member so as to be stationary relative to the outer member and being adapted to be disposed within the circumferential groove of the inner member slidably on the inner member to isolate the liquid space from an external space.

Clause 6. The seal ring according to clause 5, further having a cylindrical outer peripheral surface about the central axis and an inner peripheral surface of which a radius of curvature varies around the central axis, the radius of curvature of the inner peripheral surface of the seal ring gradually increases from the points toward the junction.

Clause 7. The seal ring according to clause 5 or 6, further having multiple protrusions protruding radially inward from an inner peripheral surface of the seal ring, the protrusions being disposed between the two points.

Clause 8. The seal ring according to clause 7, wherein a distance between the protrusion and the junction is less than a distance between the protrusion and the point.

Clause 9. The seal ring according to any one of clauses 1 to 4, wherein the outer member has a hole having a cylindrical inner peripheral surface and a liquid space communicating with the hole and containing a liquid disposed therein, and wherein
the inner member is disposed in the liquid space and is inserted into the hole,
the inner peripheral surface of the hole of the outer member having a circumferential groove,
the seal ring being adapted to be disposed within the circumferential groove of the outer member so as to be slidable on the outer member and isolating the liquid space from an external space, the inner member being adapted to be inserted into the seal ring in such a manner that the seal ring is stationary relative to the inner member.

Clause 10. The seal ring according to clause 9, further having a cylindrical inner peripheral surface about the central axis and an outer peripheral surface of which a radius of curvature varies around the central axis, the radius of curvature of the outer peripheral surface of the seal ring gradually decreases from the points toward the junction.

Clause 11. The seal ring according to clause 9 or 10, further having multiple protrusions protruding radially outward from an outer peripheral surface of the seal ring, the protrusions being disposed between the two points.

Clause 12. The seal ring according to clause 11, wherein a distance between the protrusion and the junction is less than a distance between the protrusion and the point.

What is claimed is:

1. A circular annular seal ring made from a resin and adapted to be disposed between an outer member and an inner member that rotate relative to each other, the seal ring being formed from an elongated and arcuate rod to define a circle by joining ends of the rod, the seal ring comprising:
a junction formed from the ends; and
a radial thickness continually decreasing from two points that are apart from the junction toward the junction,
the points being separated from the junction by an angle of not less than 60 degrees and not more than 150 degrees about a central axis of the circle, wherein the outer member comprises a hole having a cylindrical inner peripheral surface and a liquid space communicating with the hole and containing a liquid disposed therein, and wherein
the inner member is disposed in the liquid space and is inserted into the hole,
the inner member comprises an outer peripheral surface having a circumferential groove, and
the seal ring is adapted to be inserted into the hole of the outer member so as to be stationary relative to the outer member and is adapted to be disposed within the circumferential groove on the outer peripheral surface of the inner member so as to be slidable on the inner member, wherein the seal ring isolates the liquid space within the outer member from an external space.

2. The seal ring according to claim 1, wherein the points are apart from the junction by an angle of not less than 80 degrees and not more than 120 degrees about the central axis of the circle.

3. The seal ring according to claim 1, wherein a ratio of the thickness at the junction to the thickness at the points is not less than 0.2 and not more than 0.6.

4. The seal ring according to claim 1, wherein a ratio of the thickness at the junction to the thickness at the points is not less than 0.3 and not more than 0.5.

5. The seal ring according to claim 1, further comprising a cylindrical outer peripheral surface about the central axis and an inner peripheral surface of which a radius of curvature varies around the central axis, the radius of curvature of the inner peripheral surface of the seal ring gradually increases from the points toward the junction.

6. The seal ring according to claim 1, further comprising multiple protrusions protruding radially inward from an inner peripheral surface of the seal ring, the protrusions being disposed between the two points.

7. The seal ring according to claim 6, wherein a distance between the protrusion and the junction is less than a distance between the protrusion and the point.

8. A circular annular seal ring made from a resin adapted to be disposed between an outer member and an inner member that rotate relative to each other, the seal ring being formed from an elongated and arcuate rod to define a circle by joining ends of the rod, the seal ring comprising:
a junction formed from the ends; and
a radial thickness continually decreasing from two points that are apart from the junction toward the junction,
the points being separated from the junction by an angle of not less than 60 degrees and not more than 150 degrees about a central axis of the circle, wherein the outer member comprises a hole having a cylindrical inner peripheral surface and a liquid space communicating with the hole and containing a liquid disposed therein, and wherein the inner member is disposed in the liquid space and is inserted into the hole, the cylindrical inner peripheral surface of the hole of the outer member has a circumferential groove, and the seal ring is adapted to be disposed within the circumferential groove on the cylindrical inner peripheral surface of the hole of the outer member so as to be slidable on the outer member, and the seal ring is adapted to surround the inner member in such a manner that the seal ring is stationary relative to the inner member, wherein the seal ring isolates the liquid space within the outer member from an external space.

9. The seal ring according to claim 8, further comprising multiple protrusions protruding radially outward from an outer peripheral surface of the seal ring, the protrusions being disposed between the two points.

10. The seal ring according to claim 9, wherein a distance between the protrusion and the junction is less than a distance between the protrusion and the point.

11. The seal ring according to claim 1, wherein the ends of the elongated and arcuate rod are movable relative to each other to allow circumferential expansion of the seal ring.

12. The seal ring according to claim 8, wherein the points are apart from the junction by an angle of not less than 80 degrees and not more than 120 degrees about the central axis of the circle.

13. The seal ring according to claim 8, wherein a ratio of the thickness at the junction to the thickness at the points is not less than 0.2 and not more than 0.6.

14. The seal ring according to claim 8, wherein a ratio of the thickness at the junction to the thickness at the points is not less than 0.3 and not more than 0.5.

15. The seal ring according to claim 8, wherein the ends of the elongated and arcuate rod are movable relative to each other to allow circumferential expansion of the seal ring.

16. A sealing structure comprising:
an outer member that has a hole having a cylindrical inner peripheral surface and a liquid space communicating with the hole and containing a liquid disposed therein;
an inner member that is disposed in the liquid space and is inserted into the hole, the inner member having an outer peripheral surface having a circumferential groove, the outer member and the inner member rotating relative to each other; and
a circular annular seal ring made from a resin and inserted into the hole of the outer member so as to be stationary relative to the outer member, the seal ring being disposed within the circumferential groove on the outer peripheral surface of the inner member so as to be slidable on the inner member, wherein the seal ring isolates the liquid space within the outer member from an external space, the seal ring being formed from an elongated and arcuate rod to define a circle by joining ends of the rod, the seal ring comprising:
a junction formed from the ends; and
a radial thickness continually decreasing from two points that are apart from the junction toward the junction,
the points being separated from the junction by an angle of not less than 60 degrees and not more than 150 degrees about a central axis of the circle.

17. The sealing structure according to claim 16, wherein the ends of the elongated and arcuate rod are movable relative to each other to allow circumferential expansion of the seal ring.

18. A sealing structure comprising:
an outer member that has a hole having a cylindrical inner peripheral surface and a liquid space communicating with the hole and containing a liquid disposed therein, the cylindrical inner peripheral surface of the hole having a circumferential groove;
an inner member that is disposed in the liquid space and is inserted into the hole, the outer member and the inner member rotating relative to each other; and
a circular annular seal ring made from a resin and disposed within the circumferential groove on the cylindrical inner peripheral surface of the hole of the outer member so as to be slidable on the outer member, the seal ring surrounding the inner member in such a manner that the seal ring is stationary relative to the inner member, wherein the seal ring isolates the liquid space within the outer member from an external space, the seal ring being formed from an elongated and arcuate rod to define a circle by joining ends of the rod, the seal ring comprising:
a junction formed from the ends; and
a radial thickness continually decreasing from two points that are apart from the junction toward the junction,
the points being separated from the junction by an angle of not less than 60 degrees and not more than 150 degrees about a central axis of the circle.

19. The sealing structure according to claim 18, wherein the ends of the elongated and arcuate rod are movable relative to each other to allow circumferential expansion of the seal ring.

* * * * *